US009651111B2

(12) United States Patent
Muraoka et al.

(10) Patent No.: US 9,651,111 B2
(45) Date of Patent: May 16, 2017

(54) FLUID-FILLED VIBRATION DAMPING DEVICE

(71) Applicant: SUMITOMO RIKO COMPANY LIMITED, Komaki-shi, Aichi (JP)

(72) Inventors: Mutsumi Muraoka, Nagakute (JP); Tomomi Suzuki, Komaki (JP); Kei Okumura, Kakamigahara (JP); Wakako Michiyama, Owariasahi (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 57 days.

(21) Appl. No.: 14/718,575

(22) Filed: May 21, 2015

(65) Prior Publication Data
US 2015/0252866 A1 Sep. 10, 2015

Related U.S. Application Data

(63) Continuation of application No. PCT/JP2014/070645, filed on Aug. 5, 2014.

(30) Foreign Application Priority Data

Sep. 10, 2013 (JP) ................. 2013-187656
Sep. 10, 2013 (JP) ................. 2013-187659

(51) Int. Cl.
*F16F 13/08* (2006.01)
*F16F 13/10* (2006.01)
(52) U.S. Cl.
CPC ........... *F16F 13/08* (2013.01); *F16F 13/085* (2013.01); *F16F 13/103* (2013.01); *F16F 2230/30* (2013.01)
(58) Field of Classification Search
CPC .......... F16F 13/08; F16F 13/085; F16F 13/10; F16F 13/18; F16F 13/26; F16F 13/106
(Continued)

(56) References Cited

U.S. PATENT DOCUMENTS 5,088,700 A * 2/1992 Kanda .................. F16F 13/10
                                                    180/312
5,104,100 A * 4/1992 Simuttis ............... F16F 13/106
                                                    267/140.13
(Continued)

FOREIGN PATENT DOCUMENTS

FR      2 810 712 A1    12/2001
JP      H10-9330 A       1/1998
(Continued)

OTHER PUBLICATIONS

Nov. 11, 2014 International Search Report issued in International Application No. PCT/JP2014/070645.

*Primary Examiner* — Christopher Schwartz
(74) *Attorney, Agent, or Firm* — Oliff PLC

(57) ABSTRACT

A fluid-filled vibration damping device including a vibration damping device main unit which has a main rubber elastic body elastically connecting first and second mounting members, and a fluid chamber whose wall is partially constituted by the main rubber elastic body. The vibration damping device main unit further includes a temporary joint member locked on the second mounting member and temporarily coupled thereto in an axial direction, and an annular sealing part provided to the temporary joint member and overlapped on the second mounting member in the axial direction with a sealing rubber sandwiched therebetween for achieving a temporary seal. A sealing coupling member is mounted on the second mounting member while exerting a pressing force in a direction of overlapping on the second mounting member and the temporary joint member for increasing a compression ratio of the sealing rubber and achieving a full seal.

13 Claims, 27 Drawing Sheets

(58) Field of Classification Search
USPC ................ 267/140.11–140.15, 140.2–140.5,
267/141.1–141.7
See application file for complete search history.

(56) References Cited

U.S. PATENT DOCUMENTS

| | | | | |
|---|---|---|---|---|
| 5,876,022 A * | 3/1999 | Simuttis | ................ | F16F 13/107 |
| | | | | 248/562 |
| 5,988,611 A | 11/1999 | Takashima et al. | | |
| 6,036,183 A * | 3/2000 | Lee | ................ | F16F 13/26 |
| | | | | 267/140.13 |
| 6,131,893 A * | 10/2000 | Seynaeve | ................ | F16F 13/10 |
| | | | | 267/140.11 |
| 6,289,571 B1 | 9/2001 | Ozawa et al. | | |
| 6,311,964 B1 * | 11/2001 | Suzuki | ................ | F16F 13/268 |
| | | | | 267/140.13 |
| 6,371,462 B2 * | 4/2002 | Gennesseaux | ................ | F16F 13/26 |
| | | | | 267/122 |
| 6,409,158 B1 * | 6/2002 | Takashima | ................ | F16F 13/101 |
| | | | | 267/140.13 |
| 6,435,488 B1 * | 8/2002 | Simuttis | ................ | F16F 13/18 |
| | | | | 267/140.14 |
| 6,499,729 B1 * | 12/2002 | Walterbusch | ................ | F16F 13/10 |
| | | | | 267/140.13 |
| 2004/0201151 A1 | 10/2004 | Miyahara | | |
| 2005/0098374 A1 | 5/2005 | Moon | | |
| 2010/0264570 A1 * | 10/2010 | Thierry | ................ | F16F 1/36 |
| | | | | 267/141 |
| 2012/0318951 A1 * | 12/2012 | Hermann | ................ | F16F 13/103 |
| | | | | 248/565 |

FOREIGN PATENT DOCUMENTS

| | | |
|---|---|---|
| JP | H10-38015 A | 2/1998 |
| JP | H10-315073 A | 12/1998 |
| JP | 2000-266105 A | 9/2000 |
| JP | 2004-316723 A | 11/2004 |
| JP | 4113889 B2 | 7/2008 |

\* cited by examiner

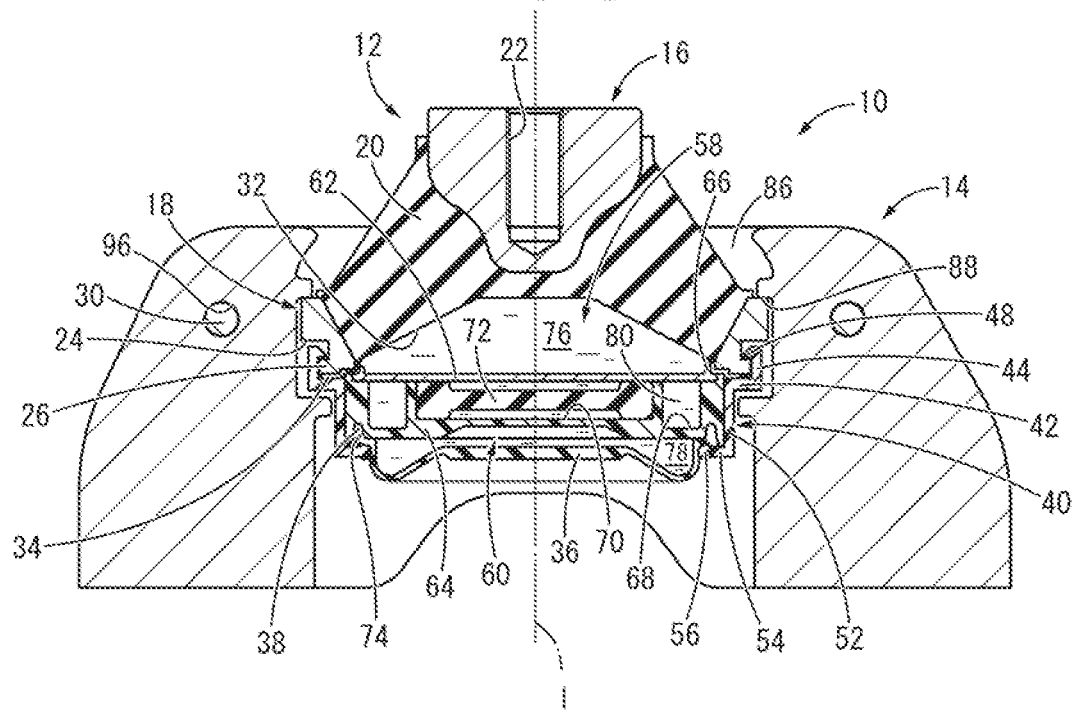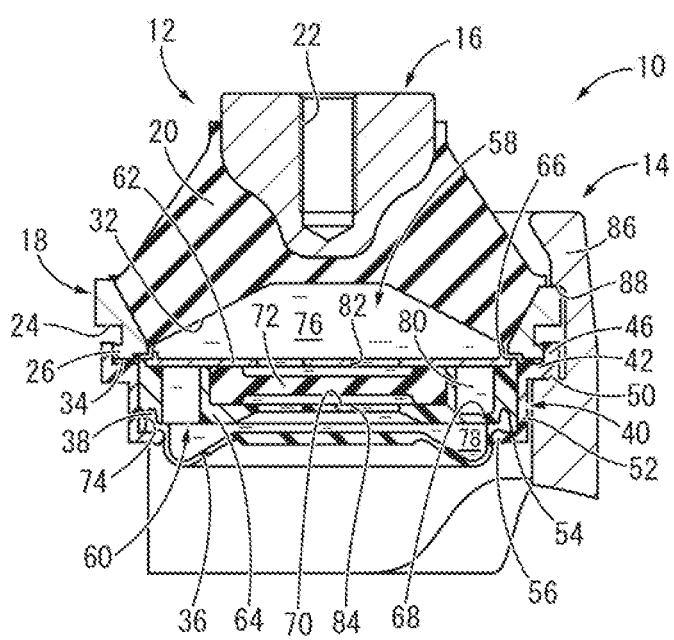

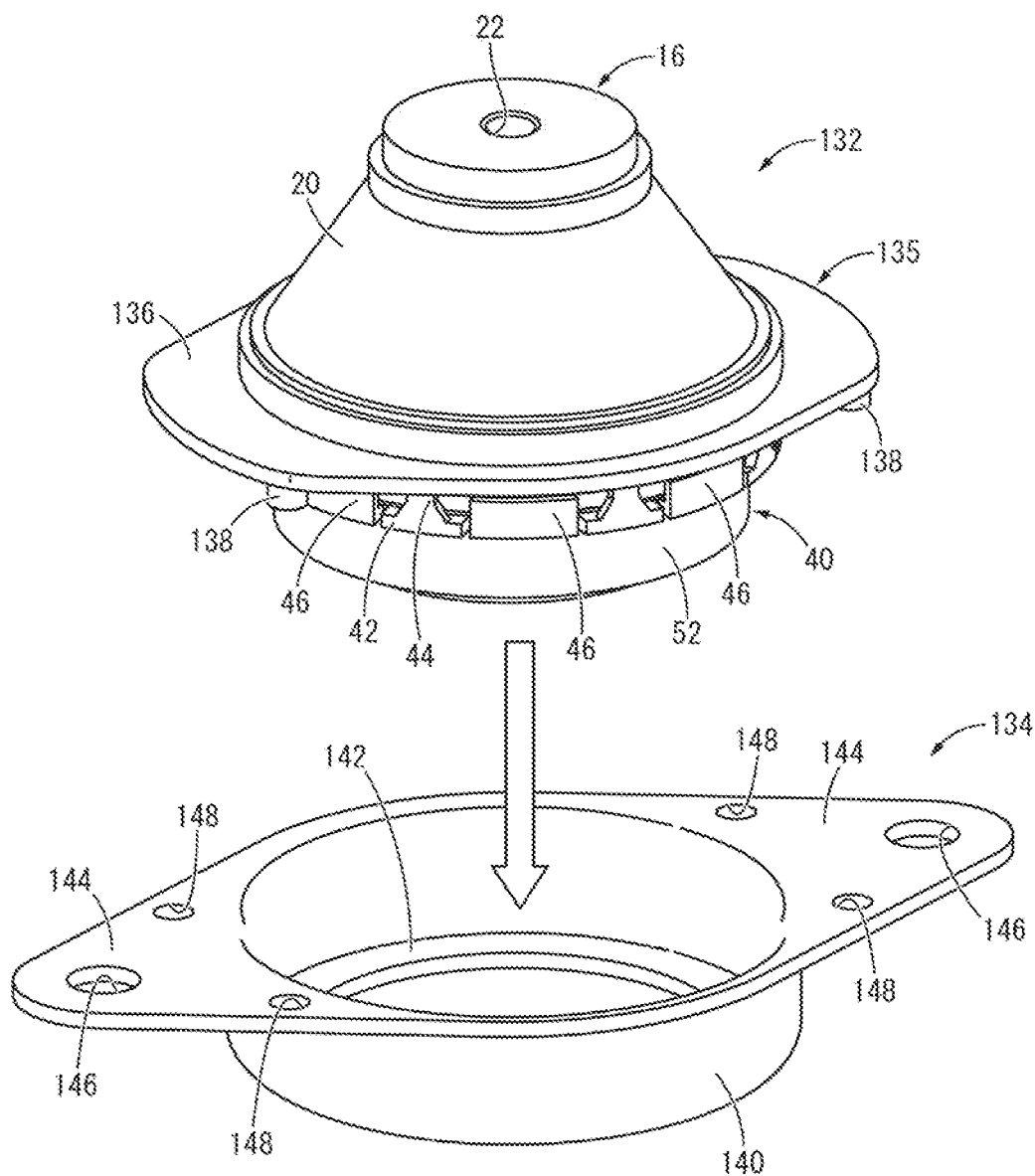

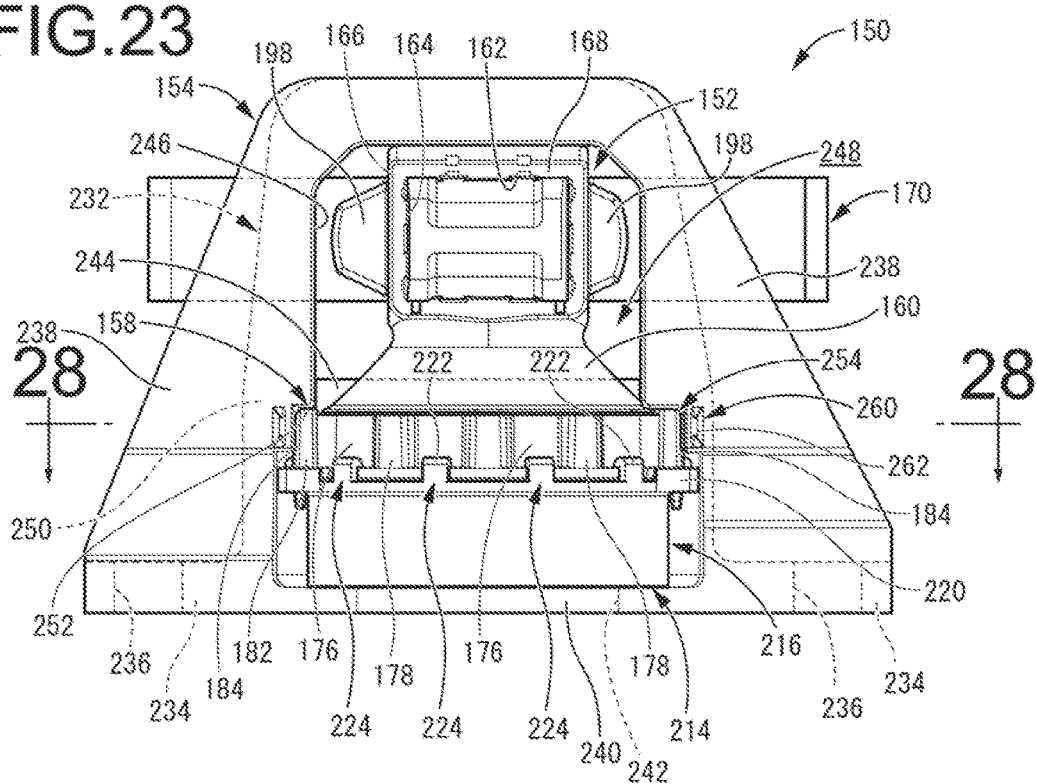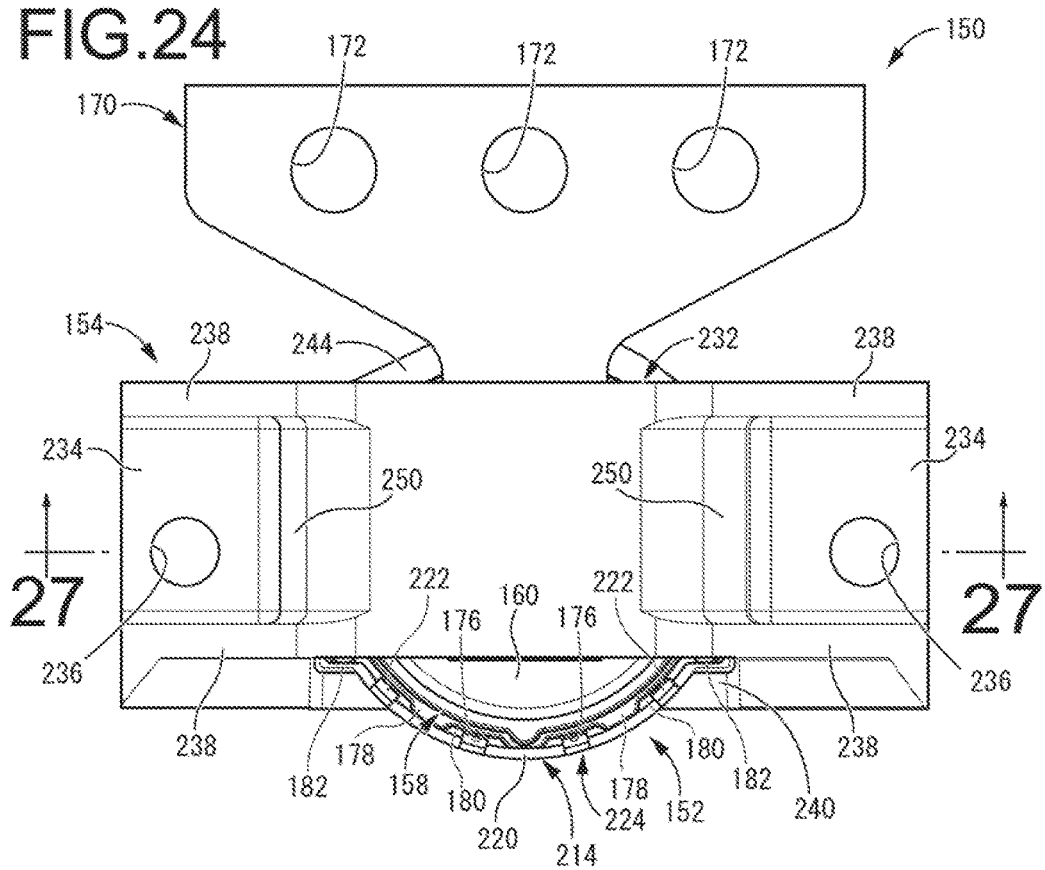

FLUID-FILLED VIBRATION DAMPING DEVICE

INCORPORATED BY REFERENCE

The disclosure of Japanese Patent Application Nos. 2013-187656 filed on Sep. 10, 2013 and 2013-187659 filed on Sep. 10, 2013, each including the specification, drawings and abstract is incorporated herein by reference in its entirety. This is a Continuation of International Application No. PCT/JP2014/070645 filed on Aug. 5, 2014.

BACKGROUND OF THE INVENTION

1. Field of the Invention

The present invention relates to a fluid-filled vibration damping device used for an automobile engine mount or the like.

2. Description of the Related Art

From the past, a fluid-filled vibration damping device has been known which is interposed between members constituting a vibration transmission system, which is one type of vibration damping support unit or vibration damping coupling unit which does mutual vibration damping connection of those members. The fluid-filled vibration damping device has a first mounting member and a second mounting member elastically connected by a main rubber elastic body, and has a constitution whereby a fluid chamber is formed for which a portion of the wall part is constituted by a main rubber elastic body, and in which a non-compressible fluid is sealed.

Incidentally, with the fluid-filled vibration damping device, for example, as shown in Japanese Unexamined Patent Publication No. JP-A-2000-266105, an outer bracket is mounted on a vibration damping device main unit equipped with a fluid chamber in which non-compressible fluid is sealed, and generally, the sealing property of the fluid chamber is ensured with the vibration damping device main unit alone before mounting of the outer bracket.

However, when trying to ensure fluid tightness of the fluid chamber with the vibration damping device main unit alone, it is necessary to use large axial dimensions for the second mounting member for providing a seal structure, and it was difficult to make the vibration damping device main unit more compact in the axial direction. Furthermore, when an attempt is made to constitute a seal structure of the fluid chamber by doing press fitting or the like of a flexible film fixing ring on the second mounting member in a tank filled with non-compressible fluid, dimensional accuracy of the second mounting member and fixing ring are required, and there was the problem that the assembly work was difficult.

In French Patent Publication No. FR 2810712, disclosed is a fluid-filled vibration damping device made to have a fluid tight sealed fluid chamber by separately attaching the integrally vulcanized molded component of the main rubber elastic body and the flexible film to the outer bracket.

However, with the constitution of FR 2810712, as was performed with the prior art fluid-filled vibration damping device, when an attempt is made to seal non-compressible fluid in the fluid chamber by assembling in a tank filled with non-compressible fluid, it is necessary to do work with a large size and large mass outer bracket formed by aluminum alloy or the like placed in a tank, and there is the risk of problems such as the assembly process being difficult, productivity decreasing, or the like.

Also, in Japanese Patent No. JP-B-4113889, disclosed is a hydraulic damping bearing for which a bellows, bulkhead, and elastic support body are joined by hooking and engaging a bearing cover on an elastic support body, and a sealing structure filled with damping fluid is completed.

However, to realize a sealing structure filled with damping fluid simply by hooking and engaging of the bearing cover, to exhibit sufficient sealing function, great strength is required for the hook engagement. To do that, when engaging the hook part provided on the bearing cover on the elastic support body, in addition to force being needed to strongly compress the sealing rubber, at the same time, large force is needed to deform the high strength hook part and engage it on the elastic support body, so there was still room for improvement from the manufacturing aspect.

SUMMARY OF THE INVENTION

The present invention has been developed in view of the above-described matters as the background, and it is an object of the present invention to provide a fluid-filled vibration damping device with a novel structure which is able to easily perform sealing of a non-compressible fluid in a fluid chamber, and which can simplify the sealing structure of the vibration damping device main unit.

The above and/or optional objects of this invention may be attained according to at least one of the following modes of the invention. The following modes and/or elements employed in each mode of the invention may be adopted at any possible optional combinations.

Specifically, a first mode of the present invention provides a fluid-filled vibration damping device comprising a vibration damping device main unit which includes a first mounting member, an annular second mounting member, a main rubber elastic body elastically connecting the first and second mounting members, and a fluid chamber whose wall is partially constituted by the main rubber elastic body and which is filled with a non-compressible fluid, wherein the vibration damping device main unit further includes a temporary joint member locked on the second mounting member and temporarily coupled thereto in an axial direction, and an annular sealing part provided to the temporary joint member and overlapped on the second mounting member in the axial direction with a sealing rubber sandwiched therebetween so as to achieve a temporary seal, and wherein a sealing coupling member is mounted on the second mounting member of the vibration damping device main unit, and the sealing coupling member exerts a pressing force in a direction of overlapping on the second mounting member and the temporary joint member so as to increase a compression ratio of the sealing rubber and achieve a full seal.

With the fluid-filled vibration damping device constituted according to this kind of first mode, by the seal structure of the vibration damping device main unit being used as a temporary seal by temporary coupling of the second mounting member and the temporary joint member, assembly of the vibration damping device main unit becomes easy, and it is possible to make the seal structure of the vibration damping device main unit simple, and possible to make the axial dimensions of the vibration damping device main unit smaller.

Furthermore, the fluid chamber is temporarily sealed with the vibration damping device main unit before mounting of the sealing coupling member, so for example even in a case when a non-compressible fluid is sealed in the fluid chamber by assembling in a tank filled with non-compressible fluid, it is not necessary to place the sealing coupling member in the tank, and the assembly work in the tank becomes easier.

Also, by having the sealing coupling member attached to the vibration damping device main unit for which non-compressible fluid is sealed in the fluid chamber, the full seal of the second mounting member and the temporary storage member is achieved, and for example even when vibration is input, leakage of non-compressible fluid is prevented, so it is possible to make the vibration damping characteristics more stable, and to obtain sufficient reliability.

A second mode of the present invention provides the fluid-filled vibration damping device according to the first mode, further comprising at least one set of a fitting convex part and a fitting hole, the fitting convex part being provided to one of the second mounting member and the sealing coupling member while the fitting hole being provided to another of the second mounting member and the sealing coupling member, wherein the fitting convex part is fit and fixed into the fitting hole.

With the second mode, by the fitting convex part being fit in the fitting hole, it is possible to easily fix the sealing coupling member to the mount body. In particular, compared to a structure with the sealing coupling member externally fit and fixed to the mount body, it is possible to select the sealing coupling member and second mounting member forming material and shape with a high degree of freedom, and also possible to do manufacturing easily without requiring a high degree of dimensional accuracy.

A third mode of the present invention provides the fluid-filled vibration damping device according to the second mode, wherein the at least one set of the fitting convex part and the fitting hole comprises a plurality of the sets, and the plurality of the sets of the fitting convex parts and the fitting holes are arranged at both sides sandwiching a center axis of the vibration damping device main unit.

With the third mode, since the sealing coupling member is fixed to the vibration damping device main unit by the plurality of sets of the fitting convex parts and fitting holes sandwiching the center axis, there is a decrease in the moment that acts during input of a load in the center axial direction of the vibration damping device main unit, and stable support of the vibration damping device main unit is realized via the sealing coupling member.

A fourth mode of the present invention provides the fluid-filled vibration damping device according to any one of the first through third modes, further comprising a guide member that relatively aligns and guides the second mounting member and the sealing coupling member during mounting of the vibration damping device main unit to the sealing coupling member.

With the fourth mode, the vibration damping device main unit and the sealing coupling member are aligned relative to each other and guided by the guide member during mounting of the vibration damping device main unit and the sealing coupling member, so the mounting work of the vibration damping device main unit and the sealing coupling member is easier. In particular, in cases such as when fitting the fitting convex part and the fitting hole and fixing them, by relatively aligning the vibration damping device main unit and the sealing coupling member using the guide member, the fitting convex part is fitted easily to the fitting hole, so the fixing work of the vibration damping device main unit and the sealing coupling member is easier.

A fifth mode of the present invention provides the fluid-filled vibration damping device according to any one of the first through fourth modes, wherein the temporary joint member includes a locking part projecting from the sealing part in one axial direction so as to be locked to the second mounting member and a pressed part projecting from the sealing part in another axial direction so as to be pushed by the sealing coupling member in a direction of approach to the second mounting member, and the locking part and the pressed part are alternately provided on a circumference of the temporary joint member.

With the fifth mode, since the sealing part is thin walled at the part at which the locking part is formed without being equipped with a pressed part, elastic deformation of the sealing part occurs easily, and locking of the locking part to the second mounting member is realized easily. Meanwhile, by the pressing force of the sealing coupling member being applied to the formation part of the pressed part with the locking part removed, the sealing part is pressed in the direction approaching the second mounting member, and a fluid tight full seal is achieved between the second mounting member and the sealing part. In particular, by the locking parts and pressed parts being alternately provided on the circumference, stable temporary coupling of the temporary joint member to the second mounting member is realized, and the pressing force in the direction of overlapping between the second mounting member and the temporary joint member acts with good balance on the circumference, and it is possible to obtain stable fluid tightness along the entire circumference.

A sixth mode of the present invention provides the fluid-filled vibration damping device according to any one of the first through fifth modes, wherein the sealing coupling member includes a mounting part that partially covers an outer circumference of the second mounting member, the mounting part of the sealing coupling member has at least one clasping groove extending in a circumferential direction, and the second mounting member and the temporary joint member are inserted into the clasping groove and displaced to relatively get closer to each other so as to achieve the full seal between the second mounting member and the temporary joint member by the sealing rubber.

With the sixth mode, by the second mounting member and the temporary joint member being inserted into the clasping groove in an axis-perpendicular direction, the second mounting member and the temporary joint member are made to approach each other in the axial direction to achieve a full seal, so it is possible to set the compression ratio of the sealing rubber with ease and stability, and possible to realize the target sealing properties and durability.

Also, by providing the fixing structure of the sealing coupling member and the second mounting member at a position separated from the mounting part, it is possible to avoid having the structure of the mounting part being restricted by the fixing structure, and to set the second mounting member and the temporary joint member shapes with a high degree of freedom.

A seventh mode of the present invention provides the fluid-filled vibration damping device according to any one of the first through fifth modes, wherein the sealing coupling member includes a tube-shaped mounting part, and an attachment part is formed that extends to an outer circumferential side from the mounting part while a pressing part is formed that extends to an inner circumferential side from the mounting part, and the vibration damping device main unit is inserted from one axial side into the mounting part and the second mounting member of the vibration damping device main unit is fixed to the attachment part while the temporary joint member is pressed by abutting on the pressing part and displaced to relatively get closer to the second mounting member so as to achieve the full seal between the second mounting member and the temporary joint member by the sealing rubber.

With the seventh mode, even with a structure with which the vibration damping device main unit and the sealing coupling member are mounted in the axial direction, the full seal by mounting of the vibration damping device main unit and the sealing coupling member is effectively realized.

An eighth mode of the present invention provides the fluid-filled vibration damping device according to any one of the first through seventh modes, wherein the sealing coupling member is a die cast molded component made of aluminum alloy.

With the eighth mode, by using a sealing coupling member consisting of an aluminum alloy molded article, it is possible to ensure a great degree of freedom for designing the shape, structure, and strength of the sealing coupling member, and it is also possible to more easily and reliably realize prevention of the vibration damping device main unit falling out from the vibration damping device main unit with a caulking engaging part using a crushing and caulking process.

A ninth mode of the present invention provides the fluid-filled vibration damping device according to any one of the first to eighth modes, wherein a pressing section of the sealing coupling member against the second mounting member is partially provided on a circumference of the second mounting member, while a pressing section of the sealing coupling member against the temporary joint member is provided along an entire circumference of the temporary joint member.

With the ninth mode, when using the fluid-filled type vibration damping device main unit, with the vibration damping device main unit, by attaching the vibration damping device main unit to the sealing coupling member after ensuring sealing properties with the outside space of the fluid sealing area using a simple structure, it is possible to reliably ensure the sealing properties of the fluid sealing area using the sealing coupling member. Because of that, while making the structure easier that accompanies simplification of the seal structure with the vibration damping device main unit alone, it is also possible to give high level sealing properties at a level that cannot be realized with the vibration damping device main unit alone by aptly using the fitting force or the like when attaching the vibration damping device main unit to the sealing coupling member.

A tenth mode of the present invention provides the fluid-filled vibration damping device according to any one of the first through ninth modes, wherein the main rubber elastic body is disposed on a first axial side of the second mounting member while a flexible film is disposed on a second axial side of the second mounting member so as to provide the fluid chamber between the main rubber elastic body and the flexible film, a partition member is arranged between the second mounting member and the flexible film so as to partition the fluid chamber into a pressure receiving chamber and an equilibrium chamber, and an orifice passage is provided that places the pressure receiving chamber and the equilibrium chamber in communication with each other, and a pressing force by the temporary joint member is exerted on an outer circumference edge of the flexible film overlapped on an outside of the partition member in addition to a sealing member arranged between the second mounting member and the partition member so that both the sealing member and the outer circumference edge of the flexible film achieve the temporary seal while achieving the full seal provided by the sealing coupling member.

With the tenth mode, with the sealing parts of a plurality of locations on the fluid chamber equipped with the pressure receiving chamber and the equilibrium chamber, the full seal in the state with the temporary seal and the sealing coupling member in an attached state with the vibration damping device alone can be realized efficiently using one temporary joint member.

An eleventh mode of the present invention provides the fluid-filled vibration damping device according to the sixth mode, wherein a pair of fixing parts are provided to the outer circumference of the second mounting member of the vibration damping device main unit at sites opposite to each other in an axis-perpendicular direction, the at least one clasping groove comprises a pair of the clasping grooves for fitting to the fixing parts of the vibration damping device main unit which are formed on an inner surface of an installation space for the vibration damping device main unit in the sealing coupling member at sites opposite to each other while having insertion ports opening in a direction of insertion of the respective fixing parts, the pair of fixing parts are inserted from the respective insertion ports of the clasping grooves and an outer circumference surface of each fixing part is abutted against a groove bottom surface of the corresponding clasping groove so that each fixing part is fit into the corresponding clasping groove, and on an opening end surface of each insertion port of the sealing coupling member, a circumference edge part on a groove bottom surface side of the clasping groove undergoes plastic deformation in a groove inward direction by a crushing and caulking process and is engaged with a back part of the fixing part in the direction of insertion into the clasping groove so as to provide a caulking engaging part that prevents falling out of the fixing part from the clasping groove in a backward direction of insertion.

With the eleventh mode, it is possible to prevent falling out of the fixing part of the vibration damping device main unit that is fit in the clasping groove of the sealing coupling member by the caulking engaging part that is formed by the crushing and caulking process on the circumference edge part of the groove bottom surface side of the clasping groove of the sealing coupling member. In particular, with the caulking engaging part formed using the crushing and caulking process, compared to a caulking piece made by bend processing, it is possible to have much greater member strength and durability by making the member thickness greater at the engaging part with the fixing part. Also, this is not limited to being a press formed article sealing coupling member such as with a caulking pieced made by bend processing, and it is possible to use a sealing coupling member consisting of a die cast formed article or the like, for example, and possible to ensure a sufficiently high degree of design freedom for the shape, strength and the like of the sealing coupling member.

In fact, the caulking engaging part provided on the sealing coupling member can be formed by applying crushing and caulking processing external force on the sealing coupling member in the same direction as the insertion direction of the fixing part of the vibration damping device main unit in the clasping groove of the sealing coupling member. Because of that, for example as a device for receiving external force applied when doing the insertion or crushing and caulking process of the fixing part made to support the sealing coupling member, it is possible to use this in common when inserting and fitting the fixing part of the vibration damping device in the clasping groove of the sealing coupling member, and when implementing the crushing and caulking process on the sealing coupling member after that to form the caulking engaging part, making it possible to simplify the manufacturing equipment. Also, for example, it is also possible to use in common an actuator or transmission mechanism or the like for applying the necessary external force for insertion and crushing and caulking both when inserting and fitting the fixing part of the vibration damping device main unit into the clasping groove of the sealing coupling member, and when implementing the crushing and caulking process on the sealing coupling member after that to form the caulking engaging part, making it possible to further simplify the manufacturing equipment.

A twelfth mode of the present invention provides the fluid-filled vibration damping device according to the eleventh mode, wherein on each groove bottom surface of the clasping grooves, a tilt is given such that a separation distance in a direction of opposition of the clasping grooves gradually becomes larger toward the insertion ports, while on each outer circumference surface of the fixing parts, a tilt is given corresponding to that of the groove bottom surface of the clasping groove.

With the twelfth mode, while ensuring an abutting fitting structure of the outer circumference surface of the pair of fixing parts in relation to the groove bottom surface of the pair of opening grooves, it is possible to give a tilt that mutually expands at the groove bottom surface of the pair of opening grooves. Because of that, for example even when using a die cast formed article for the sealing coupling member, it is possible to give an incline for die cutting to the groove bottom surface of the opening groove to make manufacturing easier.

With the pair of opening grooves, it is also possible to give a tilt for which the distance between facing surfaces in the groove width direction gradually becomes larger facing the insertion port to the wall inner surface at both sides in the groove width direction as well. By doing this, it is possible to also give an incline for die cutting or the like on both side wall inner surfaces of the opening groove as well. Also, at that time, it is preferable to give a tilt corresponding to both side wall inner surfaces of the clasping groove to each fixing part as well.

A thirteenth mode of the present invention provides the fluid-filled vibration damping device according to the twelfth mode, wherein each outer circumference surface of the fixing parts is constituted by a plurality of abutting projections divided via recesses in the direction of insertion into the corresponding clasping groove, and each of the abutting projections is abutted against the groove bottom surface of the clasping groove.

With the thirteenth mode, it is possible to have each outer circumference surface of the pair of fixing parts be abutted and fit in the plurality of areas separated in the insertion direction by the plurality of abutting projections on each groove bottom surface of the pair of clasping grooves formed using roughly flat tilt surfaces that mutually expand. Specifically, by appropriately setting the projection height of each abutting projection that is substantially independently formed in the insertion direction, it is possible to more stably ensure a reliably broad area for the fitting surface of the fixing part to the clasping groove.

A fourteenth mode of the present invention provides the fluid-filled vibration damping device according to any one of the eleventh through thirteenth modes, wherein a concave crushed part formed by the crushing and caulking process on the opening end surface of each insertion port of the sealing coupling member has an asymmetrical inner surface shape such that a deepest position thereof is biased to the groove bottom surface side of the clasping groove.

With the fourteenth mode, by using a concave crushed part that has an asymmetrical inner surface shape, the caulking engaging part that prevents falling out that is engaged at the back part of the fixing part can be formed with more stability. Specifically, this concave crushed part is formed by implementing the crushing and caulking process at the opening end surface of the insertion port of the sealing coupling member using a punch shaped jig or the like, for example, but by biasing the deepest position of the crushed part to the groove bottom surface side of the clasping groove, the depth of the crushed part is suppressed and problems such as breaking or the like of the sealing coupling member is avoided, and thickness deviation by the crushed part can be efficiently created at the groove bottom surface side of the clasping groove, and it is possible to form the caulking engaging part that engages with the back part of the fixing part.

With the present invention, with the vibration damping device main unit, by having the temporary joint member locked to the second mounting member for easy temporary coupling, the second mounting member and the temporary joint member sandwich the sealing rubber and are overlapped in the axial direction for temporary sealing, and also, by the second mounting member and the temporary joint member being pressed in the direction of overlapping by the pressing force applied by mounting of the sealing coupling member on the vibration damping device main unit, the compression ratio of the sealing rubber is increased and a full seal is achieved. By doing this, it is possible to make manufacturing of the vibration damping device main unit simpler, and while the assembly work of the vibration damping device main unit is made easier, in the state with the sealing coupling member mounted on the vibration damping device main unit, fluid tightness of the fluid chamber is sufficiently ensured, and high reliability is realized.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein:

FIG. 5 is a cross section view taken along line 5-5 of FIG. 1;

FIG. 6 is a cross section view taken along line 6-6 of FIG. 1;

FIG. 21 is a perspective view suitable for explaining the mounting process of a sealing coupling member to a mount body during the manufacturing process of the engine mount shown in FIG. 19;

FIG. 22A shows the temporary seal state, and FIG. 22B shows the full seal state;

FIG. 23 is a front view showing an engine mount as a fourth embodiment of the present invention;

FIG. 24 is a plan view of the engine mount shown in FIG. 23;

DETAILED DESCRIPTION OF PREFERRED EMBODIMENTS

Figure 1:
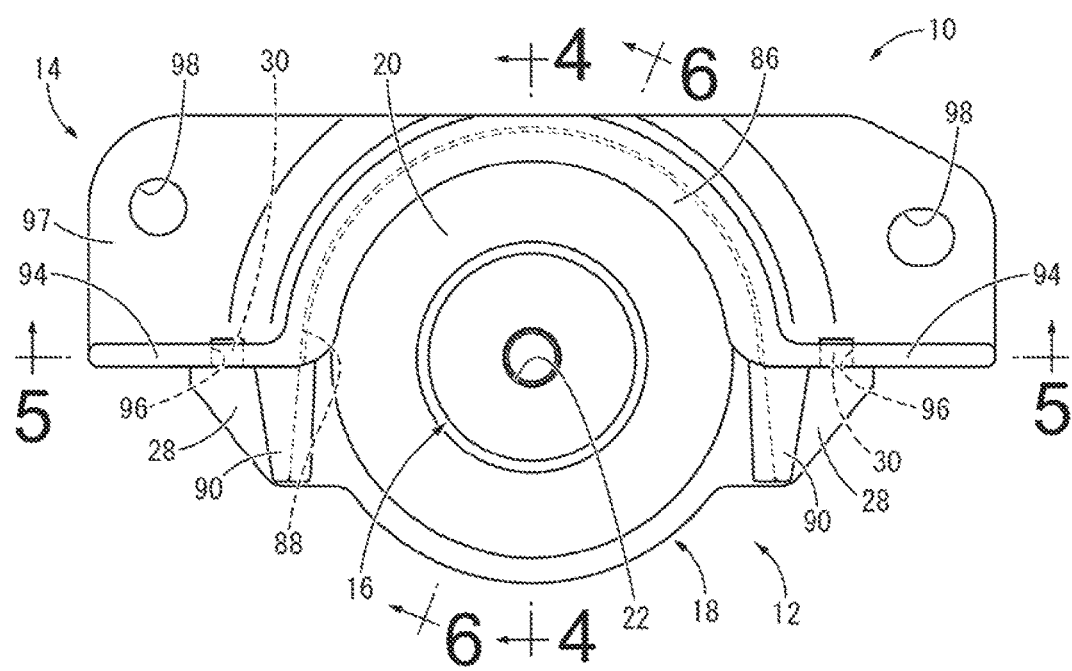
FIG. 1 is a plan view showing a fluid-filled vibration damping device in the form of an engine mount as a first embodiment of the present invention.

Following, we will describe embodiments of the present invention while referring to the drawings.

FIGS. 1 to 6 show an automobile engine mount 10 as a first embodiment of the fluid-filled vibration damping device constituted according to the present invention. The engine mount 10 has a constitution for which a sealing coupling member 14 is mounted on a mount body 12 as the vibration damping device main unit, and the mount body 12 has a constitution for which a first mounting member 16 and a second mounting member 18 are mutually elastically connected by a main rubber elastic body 20. With this embodiment, the constitution has a bracket part formed as an integrated unit with the sealing coupling member 14. With the description below, as a rule, the vertical direction means the vertical direction in FIG. 3 which is the mount axial direction.

In more specific detail, the first mounting member 16 is a highly rigid member formed using an iron or aluminum alloy, a hard synthetic resin or the like, and exhibits a solid, roughly circular block shape. Furthermore, a screw hole 22 that opens at the top surface is formed on the first mounting member 16, and by an inner bracket (not illustrated) being fixed by a bolt, the first mounting member 16 is attached to a power unit (not illustrated) via an inner bracket.

The second mounting member 18 is a highly rigid member the same as the first mounting member 16, and exhibits a roughly round ring shape, and also the inner circumference surface is a tilted surface for which the diameter expands facing upward. Furthermore, the second mounting member 18 has a locking groove 24 extending continuously as a ring in the circumference direction open at the outer circumference surface, and a lower side wall part that sandwiches the locking groove 24 is used as an engaging projection 26.

Figure 2:
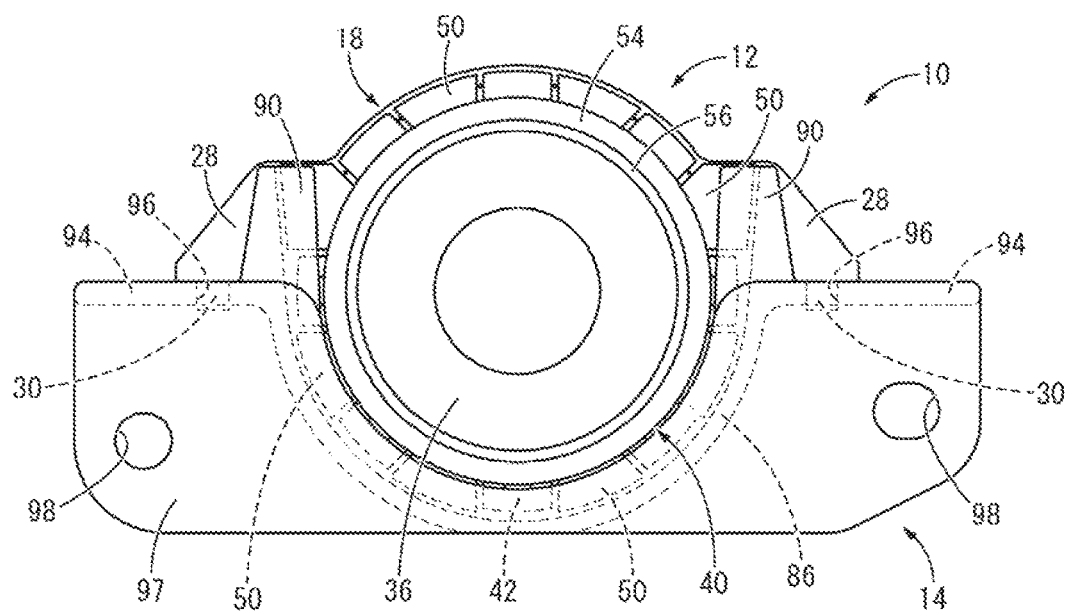
FIG. 2 is a bottom view of the engine mount shown in FIG. 1.
Figure 3:
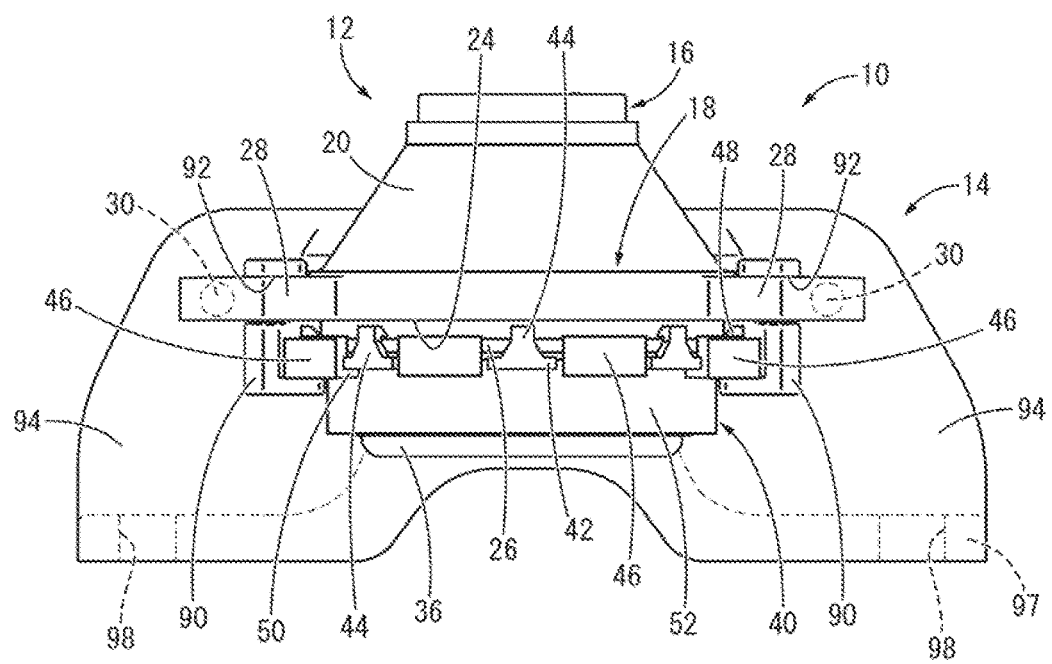
FIG. 3 is a front view of the engine mount shown in FIG. 1.

Furthermore, a pair of guide parts 28, 28 are integrally formed on the second mounting member 18. As shown in FIGS. 1 to 3, the guide parts 28 are thick walled plate shapes that expand in the axis-perpendicular direction, and project to the outer circumference side at the top part of the second mounting member 18. Yet further, the front surface of the guide part 28 (top surface in FIG. 1) is positioned at roughly the front-back center of the second mounting member 18, and a fitting convex part 30 with a small diameter round pillar shape projects facing forward from the front surface of the guide part 28. With this embodiment, a pair of fitting convex parts 30, 30 are arranged at both sides sandwiching the mount center axis.

Also, the first mounting member 16 is arranged upward on roughly the same center axis as the second mounting member 18, and these are mutually elastically connected by the main rubber elastic body 20. The main rubber elastic body 20 has a thick walled, large diameter, roughly conical trapezoid shape, the first mounting member 16 is adhered by vulcanization to the small diameter side end part, and the inner circumference surface of the second mounting member 18 is adhered by vulcanization to the outer circumference surface of the large diameter side end part. The main rubber elastic body 20 is formed as an integrally vulcanized molded component equipped with the first mounting member 16 and the second mounting member 18.

Furthermore, a large diameter recess 32 is formed on the main rubber elastic body 20. The large diameter recess 32 is a recess that exhibits an opposite facing, roughly mortar shape, and opens toward the large diameter side end surface of the main rubber elastic body 20.

Yet further, a sealing rubber 34 is formed on the outer circumference side of the large diameter recess 32. The sealing rubber 34 is a thin walled rubber layer adhered so as to cover the bottom surface of the second mounting member 18, and with this embodiment, it is integrally formed with the main rubber elastic body 20.

Also, a flexible film 36 is attached to the second mounting member 18 that constitutes an integrally vulcanized molded component of the main rubber elastic body 20. The flexible film 36 is a roughly thin walled circular rubber film, and the outer circumference part has a shape that slacks at top and bottom. Furthermore, a fixing part 38 that projects upward is provided on the outer circumference end part of the flexible film 36. This flexible film 36 is attached to the second mounting member 18 by the outer circumference end part including the fixing part 38 being gripped between a temporary joint member 40 attached to the second mounting member 18 and a partition member 60 described later.

The temporary joint member 40 is a member which has a round tube shape with a thin walled large diameter step for which the top part has a large diameter, and is formed using metal or a hard synthetic resin. In more specific detail, the temporary joint member 40 has a step shaped sealing part 42 provided that expands in roughly the axis-perpendicular direction. With this sealing part 42, the inner circumference end part is a continuous ring along the entire circumference, and the outer circumference part is divided into a plurality of sections using gaps in the circumference direction. Also, on the outer circumference end part of the sealing part 42, a plurality of locking parts 44 extending out facing upward and a plurality of positioning parts 46 are provided alternately on the circumference.

Figure 4:
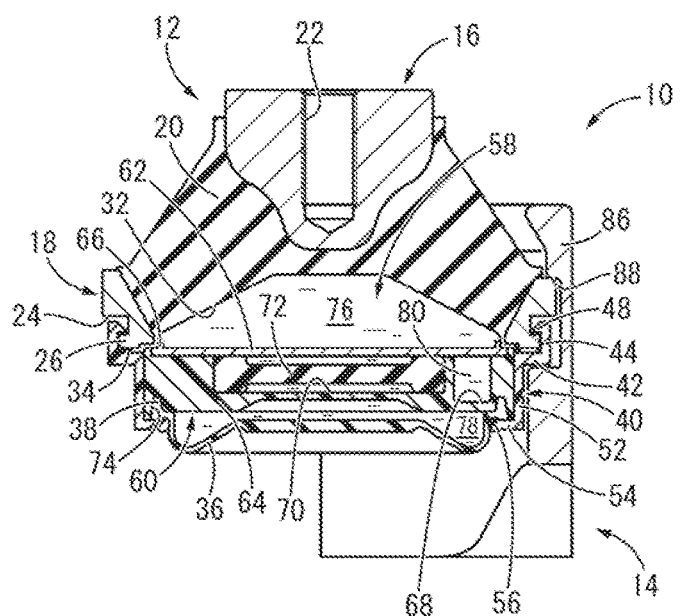
FIG. 4 is a cross section view taken along line 4-4 of FIG. 1.

As shown in FIGS. 4 and 5, the locking part 44 is equipped with a temporary joint hook 48 projecting toward the inner circumference side on the top end part. The temporary joint hook 48 has a cross section shape that gradually has a larger diameter facing upward, and the bottom surface expands in roughly the axis-perpendicular direction. The inner circumference end of the temporary joint hook 48 has a smaller diameter than the outer circumference end of the locking part 44.

As shown in FIG. 6, the positioning part 46 is thicker walled than the locking part 44, and is provided at a designated length between adjacent locking parts 44, 44 in the circumference direction. Also, a pressed part 50 projecting facing downward from the outer circumference end part of the sealing part 42 is formed on the part on which the positioning part 46 is provided on the circumference of the sealing part 42. This pressed part 50 is integrally formed on the bottom surface of the sealing part 42, and the sealing part 42 is partially thick walled on the circumference.

Meanwhile, a holding tube part 52 that extends out facing downward is provided on the inner circumference end part of the sealing part 42. The holding tube part 52 overall has a roughly round tube shape, and is equipped with an internal flange shaped presser part 54 on the inner circumference side from the lower end part. A clamping part 56 that projects vertically having a roughly circular cross section is integrally equipped on the inner circumference end part of the presser part 54.

Then, the plurality of locking parts 44 are externally fitted onto the engaging projections 26 of the second mounting member 18, and by the temporary joint hook 48 of each locking part 44 being respectively inserted in the locking groove 24 of the second mounting member 18 and locked in the axial direction to the engaging projection 26, the temporary joint member 40 is temporarily coupled in relation to the second mounting member 18. Also, by the temporary joint member 40 sandwiching the sealing rubber 34 and being overlapped on the second mounting member 18, a temporary seal is achieved between the second mounting member 18 and the sealing part 42 of the temporary joint member 40, and at least in the state with load not input, a fluid tight seal is achieved between the second mounting member 18 and the temporary joint member 40. By the positioning part 46 being externally fitted onto the engaging projection 26 of the second mounting member 18, the second mounting member 18 and the temporary joint member 40 are aligned in the axis-perpendicular direction.

Furthermore, by the presser part 54 of the temporary joint member 40 being overlapped from below on the outer circumference end part of the flexible film 36, and the outer circumference end part of the flexible film 36 being sandwiched between the presser part 54 and the partition member 60 described later, the flexible film 36 is attached to the second mounting member 18. By the flexible film 36 being attached to the second mounting member 18 in this way, a fluid chamber 58 in which non-compressible fluid is sealed, and which is separated from the external space, is formed between the main rubber elastic body 20 and the flexible film 36 opposed in the axial direction within the mount body 12. As the non-compressible fluid sealed in the fluid chamber 58, it is possible to use water, alkylene glycol, polyalkylene glycol, silicone oil, or mixed liquid of these or the like. Also, to efficiently obtain the vibration damping effect based on the fluid flow action of the fluid described later, it is preferable to use a low viscosity fluid of 0.1 Pa·s or lower.

Also, a partition member 60 is housed and arranged in the fluid chamber 58. The partition member 60 is equipped with a lid member 62 and a partition member main body 64. The lid member 62 has a thin walled, roughly round disk shape, and on the outer circumference part, an abutting projection 66 that projects upward is integrally formed.

The partition member main body 64 has a thick walled roughly round disk shape, and on the outer circumference part, a circumferential groove 68 is formed extending by a designated length in the circumference direction while opening at the top surface. Furthermore, a circular housing recess 70 that opens upward is formed on the radial direction center part of the partition member main body 64, and a movable film 72 is arranged on the housing recess 70. The movable film 72 is a roughly round disk shaped rubber elastic body, and the outer circumference end part is thick walled and projects vertically. A concave groove 74 that opens downward is formed on the outer circumference part of the partition member main body 64, and the fixing part 38 of the flexible film 36 is inserted and aligned in the axis-perpendicular direction.

Also, the partition member 60 is constituted by the lid member 62 being overlapped on the top surface of the partition member main body 64, and is installed in the fluid chamber 58. The partition member 60 is supported by the outer circumference end part being sandwiched in the axial direction between the second mounting member 18 and the presser part 54 of the temporary joint member 40, and expands inside the fluid chamber 58 in the axis-perpendicular direction. By doing this, the fluid chamber 58 is divided in two vertically sandwiching the partition member 60, and above the partition member 60, a portion of the wall part is constituted by the main rubber elastic body 20, and a pressure receiving chamber 76 for which internal pressure fluctuations are caused by vibration input is formed, and also, beneath the partition member 60, a portion of the wall part is constituted by the flexible film 36, and an equilibrium chamber 78 for which volume changes are easily permitted is formed.

Also, the circumferential groove 68 of the partition member 60 has the top side opening covered by the lid member 62 to form a tunnel shaped flow path, and both end parts are in communication one each with the pressure receiving chamber 76 and the equilibrium chamber 78. By doing this, an orifice passage 80 mutually in communication with the pressure receiving chamber 76 and the equilibrium chamber 78 is formed using the circumferential groove 68. With the orifice passage 80, by appropriately setting the passage cross section area (A) and passage length (L) ratio (A/L) while considering the wall spring rigidity and the like of the fluid chamber 58, the tuning frequency which is the resonance frequency of the flowing fluid is set to a low frequency of approximately 10 Hz which correlates to engine shake.

Also, on the top surface of the movable film 72 arranged in the housing recess 70, liquid pressure of the pressure receiving chamber 76 is applied through an upper through hole 82 formed by piercing through the lid member 62, and on the bottom surface of the movable film 72, liquid pressure of the equilibrium chamber 78 is applied through a lower through hole 84 formed by piercing through the partition member main body 64. By doing this, the movable film 72 is elastically deformed in the thickness direction by the relative pressure fluctuation of the pressure receiving chamber 76 and the equilibrium chamber 78, and liquid pressure is transmitted between the pressure receiving chamber 76 and the equilibrium chamber 78.

Figure 7:
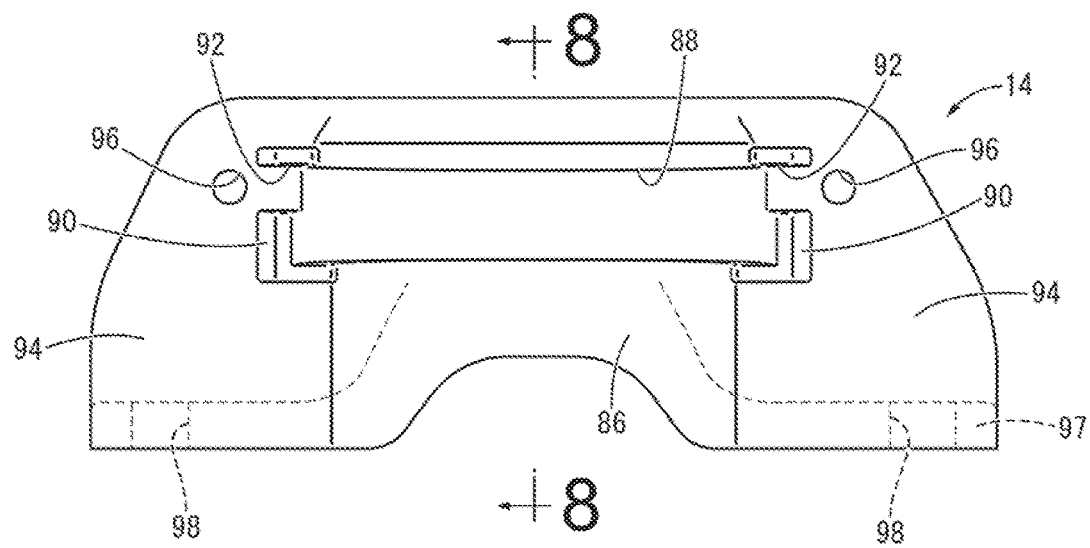
FIG. 7 is a front view of a sealing coupling member of the engine mount shown in FIG. 1.
Figure 8:
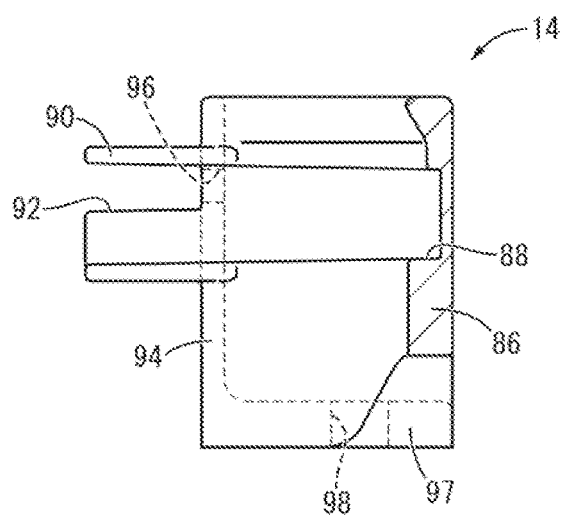
FIG. 8 is a cross section view taken along line 8-8 of FIG. 7.
Figure 9:
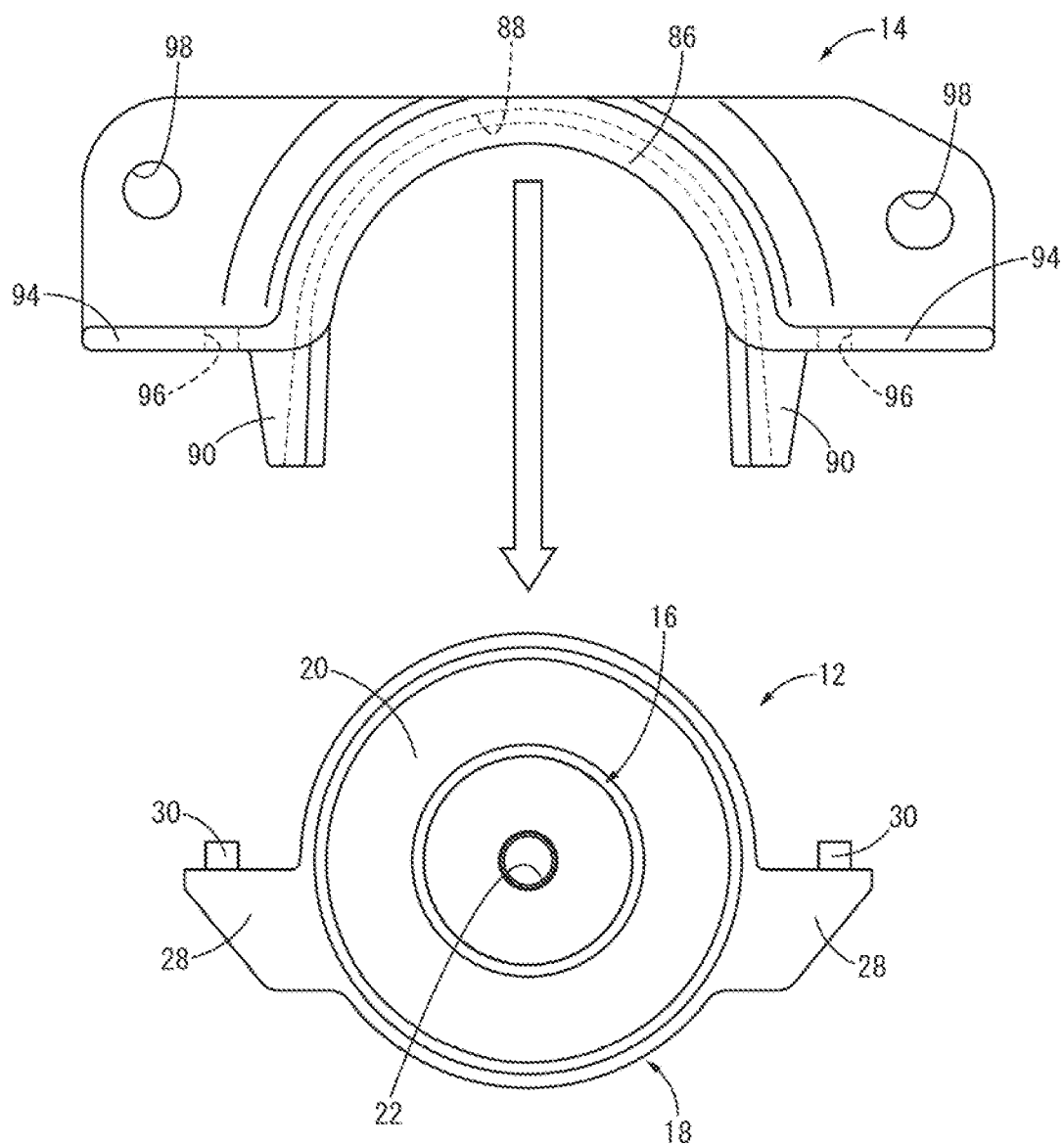
FIG. 9 is a plan view suitable for explaining the mounting process of the sealing coupling member to a mount body.

The sealing coupling member 14 is attached to the mount body 12 constituted as noted above. The sealing coupling member 14 is a highly rigid member formed using iron or an aluminum alloy or the like, and as shown in FIGS. 1 to 8, is equipped with a mounting part 86 that partially covers the outer circumference surface of the second mounting member 18. The mounting part 86 has a roughly semicircular tube shape, and as shown in FIGS. 7 and 8, a clasping groove 88 extending in the circumference direction that opens at the inner circumference surface is formed. This clasping groove 88 is formed extending out even further to the circumference direction outside by a guide part 90 as a guide member projecting with a groove shaped cross section from the circumferential end part of the mounting part 86. Also, on the groove shaped guide part 90, a notch 92 is formed that pierces through the bottom wall part opening at the projecting tip end.

Furthermore, at both end parts in the circumference direction of the mounting part 86, respective fastening plate parts 94 are formed as an integrated unit expanding to the lateral outsides in FIG. 7. On these fastening plate parts 94, 94 are respectively formed by piercing fitting holes 96 with a hole cross section shape corresponding to the fitting convex part 30. Yet further, on the bottom end part of the mounting part 86 and the fastening plate part 94, an attachment plate part 97 is integrally formed, and on the attachment plate part 97, a bolt hole 98 that is formed by piercing through the attachment plate part 97 in the thickness direction is formed.

By inserting the second mounting member 18 of the mount body 12 and the top part of the temporary joint member 40 in the clasping groove 88 of the sealing coupling member 14 constituted in this way, the sealing coupling member 14 is guided and approaches from the side while being aligned in relation to the mount body 12. Also, the guide part 28 of the second mounting member 18 is inserted in the notch 92 of the sealing coupling member 14, and the fitting convex part 30 of the guide part 28 is fit into the fitting hole 96 of the fastening plate part 94 and fixed. By doing this, the sealing coupling member 14 is arranged so as to partially cover the outer circumference of the second mounting member 18, and the sealing coupling member 14 is mounted on the mount body 12. With this embodiment, two sets of mutually fit fitting convex parts 30 and fitting holes 96 are arranged at both sides sandwiching the center axis of the mount body 12.

Figure 10:
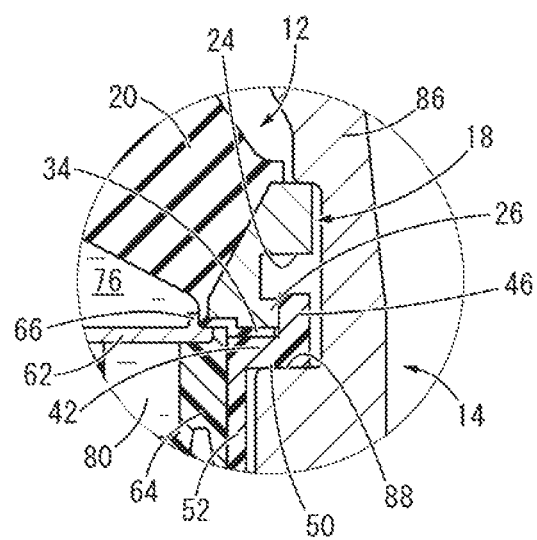
FIG. 10 is a vertical cross section view showing an enlarged view of a principal part of the engine mount.
Figure 11:
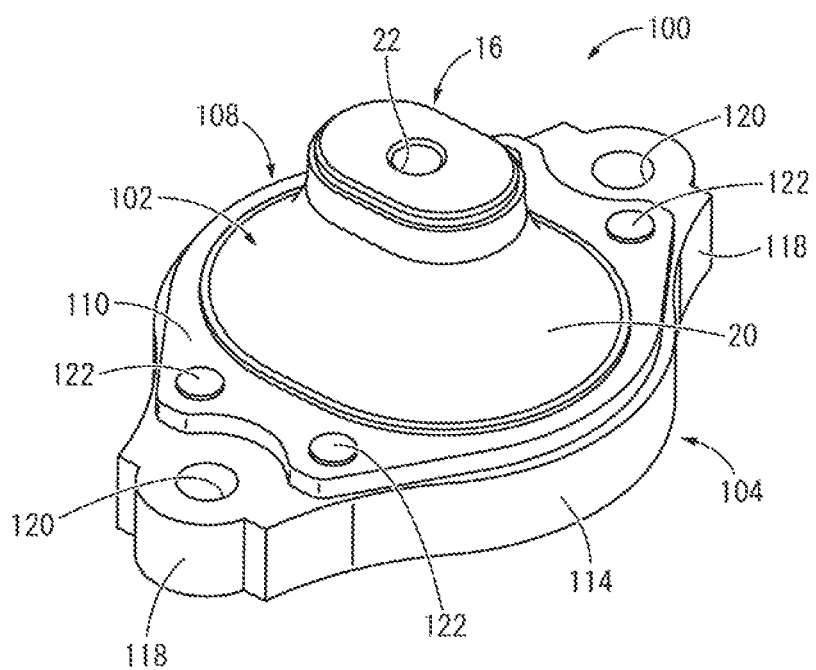
FIG. 11 is a perspective view of an engine mount constituted according to a second embodiment of the present invention.
Figure 12:
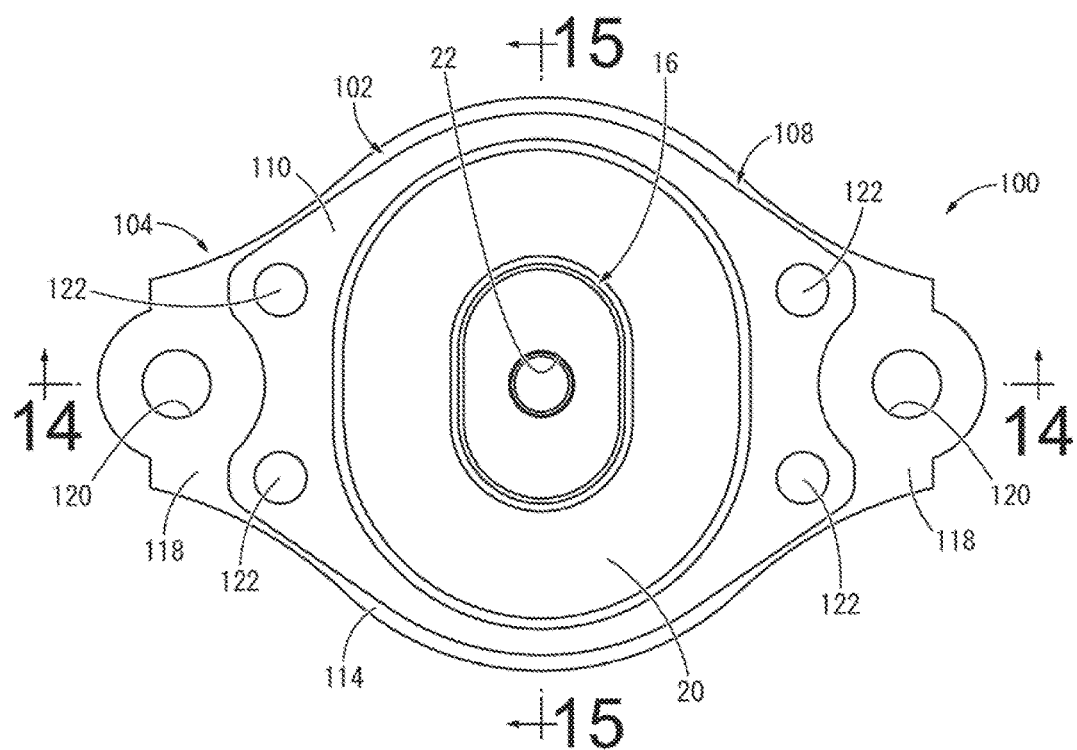
FIG. 12 is a plan view of the engine mount shown in FIG. 11.
Figure 13:
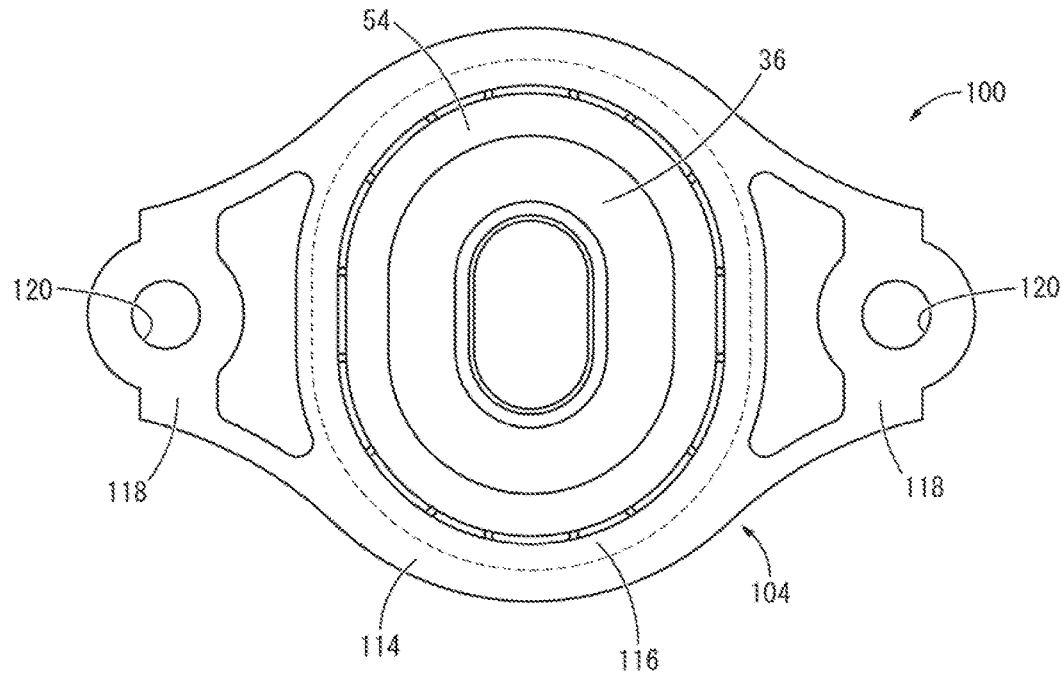
FIG. 13 is a bottom view of the engine mount shown in FIG. 12.
Figure 14:
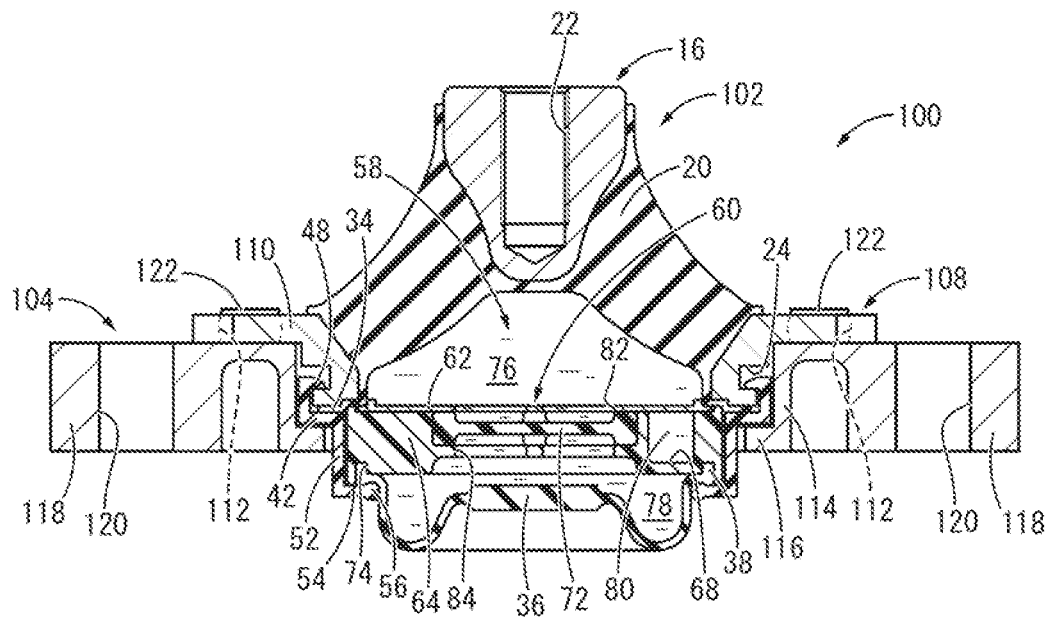
FIG. 14 is a cross section view taken along line 14-14 of FIG. 12.
Figure 15:
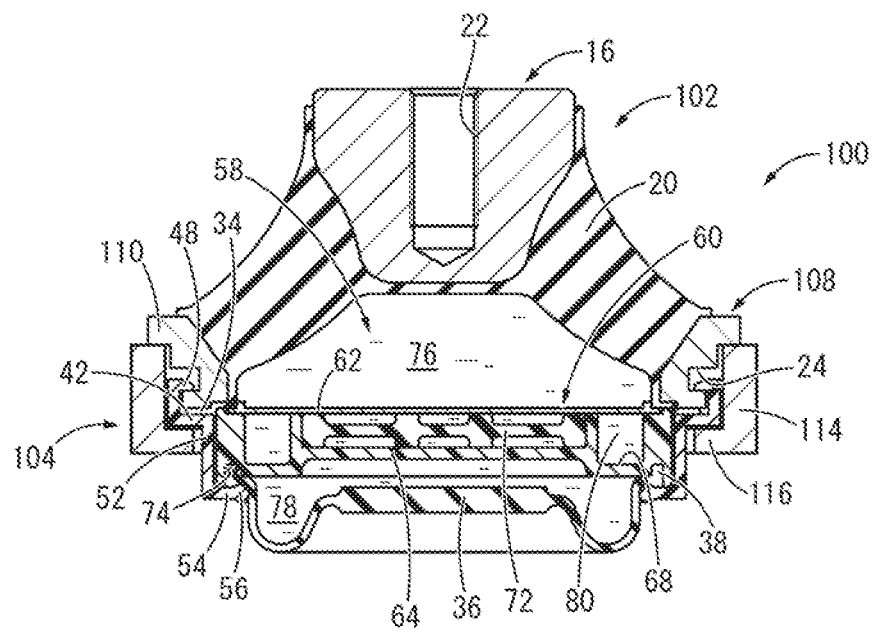
FIG. 15 is a cross section view taken along line 15-15 of FIG. 12.

Here, as shown in FIG. 10, by the second mounting member 18 as well as the sealing part 42 and the pressed part 50 of the temporary joint member 40 being inserted in the clasping groove 88, pressing force in the direction of overlapping is applied by the sealing coupling member 14 on the second mounting member 18 and the temporary joint member 40, and the sealing part 42 is made to be relatively displaced approaching the second mounting member 18. By doing this, the compression ratio of the sealing rubber 34 sandwiched between the second mounting member 18 and the sealing part 42 is increased, so the full seal is achieved between the second mounting member 18 and the sealing part 42, and fluid tightness is also maintained when a vibration load is input.

With this embodiment, by mounting of the sealing coupling member 14 on the mount body 12, pressing force is applied in the direction of overlapping on the second mounting member 18 and the presser part 54 of the temporary joint member 40, and the compression ratio of the sealing rubber 34 is increased also between the second mounting member 18 and the partition member 60, and the compression ratio of the outer circumference end part of the flexible film 36 is increased between the temporary joint member 40 and the partition member 60. By doing this, fluid tightness is improved with both the pressure receiving chamber 76 and the equilibrium chamber 78. A clamping part 56 is provided on the top part on the presser part 54 of the temporary joint member 40 of this embodiment, the compression ratio of the flexible film 36 is efficiently increased between the temporary joint member 40 and the partition member 60, and the seal properties are advantageously ensured.

With this embodiment, the abutting projection 66 of the lid member 62 is inserted in the large diameter recess 32 of the main rubber elastic body 20, and is made to overlap the inner circumference surface of the large diameter recess 32. By doing this, swelling deformation to the inner circumference side of the sealing rubber 34 is prevented by abutting on the abutting projection 66, and there is advantageous improvement in the seal properties by the increase in the compression ratio of the sealing rubber 34.

With the engine mount 10 constituted according to this kind of embodiment, assembly is done with a simple temporarily coupled structure for which the mount body 12 locks the temporary joint member 40 to the second mounting member 18, and by the sealing rubber 34 being grasped between the second mounting member 18 and the temporary joint member 40 sealing part 42, a temporary seal is achieved. By doing this, the assembly work of the mount body 12 is easier, and for example by assembling the mount body 12 in a tank filled with non-compressible fluid, it is possible to easily seal non-compressible fluid in the fluid chamber 58. In this way, with the mount body 12 alone, since sealing of the non-compressible fluid is realized using the temporary seal, it is possible to perform the non-compressible fluid sealing process before mounting on the sealing coupling member 14, which improves work efficiency.

The temporary joint member 40 is for aligning each member (the main rubber elastic body 20, the partition member 60, and the flexible film 36) before performing full sealing and joining using the sealing coupling member 14, and in an attached state of each member aligned by the temporary joint member 40, this is a seal state of a low practical use level which does not take use environments into consideration.

In this way, with the temporary joint member 40, as seal performance of a low practical use level that does not take the use environment into consideration, the joining structure that satisfies the sealing performance is clearly made to be realized by the sealing coupling member 14, and it is possible to make the temporary joint member 40 small and of low strength, so when doing the interim work of aligning each member that was the original purpose, it is possible to easily perform the manufacturing work by having low strength for which it is possible to deform the temporary joint hook 48.

Also, by the sealing coupling member 14 being attached to the mount body 12, the compression ratio of the sealing rubber 34 is increased, and the full seal is achieved between the second mounting member 18 and the temporary joint member 40. By doing this, even in a state mounted on the vehicle with vibration input, it is possible to prevent non-compressible fluid from leaking out from the fluid chamber 58, and to improve reliability.

Furthermore, with this embodiment, by inserting the second mounting member 18 of the mount body 12 and the temporary joint member 40 top part in the clasping groove 88 of the sealing coupling member 14, pressing force is applied in the direction of overlapping between the second mounting member 18 and the temporary joint member 40. By doing this, it is possible to stabilize the change volume of the compression ratio of the sealing rubber 34 by mounting of the sealing coupling member 14, and while preventing damage of the sealing rubber 34 due to excess compression, sufficient sealing properties are ensured, and it is possible to effectively avoid leaking of non-compressible fluid.

Furthermore, by the second mounting member 18 of the mount body 12 and the sealing coupling member 14 being fit in the fitting hole 96 formed by piercing through the fitting convex part 30 integrally formed with the second mounting member 18 and the fastening plate part 94 of the sealing coupling member 14, these are fixed to each other. By doing this, fixing of the mount body 12 and the sealing coupling member 14 is realized by a simple structure with a low number of parts.

Yet further, by the mount body 12 and the sealing coupling member 14 being fixed to each other, by the relative displacement to the side of the mount body 12 and the sealing coupling member 14 being restricted, falling out of the second mounting member 18 from the clasping groove 88 of the sealing coupling member 14 is prevented. By doing this, the state of the mount body 12 and the temporary joint member 40 being mutually aligned is maintained, and the full seal by compression of the sealing rubber 34 is maintained with stability.

In fact, with this embodiment, the second mounting member 18 and the sealing coupling member 14 are fit with the fitting convex part 30 and the fitting hole 96 and fixed to each other at a position away from the mounting part 86 of the sealing coupling member 14. By doing this, the shape of the outer circumference surface of the second mounting member 18 and that of the inner circumference surface of the mounting part 86 can be set with a high level of freedom.

In addition, the fitting convex part 30 and the fitting hole 96 are provided one set each at both left and right sides sandwiching the center axis:1 of the mount body 12. By doing this, the moment that occurs during load input in the center axial direction of the mount body 12 is reduced, and improvement in durability as well as effective exhibition of vibration damping performance which is the goal are realized.

Also, when the sealing coupling member 14 is mounted on the mount body 12, by the second mounting member 18 of the mount body 12 and the temporary joint member 40 being inserted in the clasping groove 88 of the sealing coupling member 14 and guided, the sealing coupling member 14 is made to be easily mounted at a designated position on the mount body 12. In particular, with the sealing coupling member 14 of this embodiment, the guide part 90 is provided projecting to the circumference direction outside of the mounting part 86, and by the guide part 28 of the second mounting member 18 being inserted in the notch 92 formed on the guide part 90, the guide action is more effectively exhibited.

Also, with the temporary joint member 40 of this embodiment, the locking part 44 locked to the second mounting member 18 and the positioning part 46 overlapping the outer circumference surface of the second mounting member 18 are provided alternately, and at the positioning part 46 formation part, the pressed part 50 projecting downward from the sealing part 42 is formed. By doing this, by the thin walled sealing part 42 being elastically deformed at the locking part 44 formation part, attachment by pressing in the axial direction in relation to the second mounting member 18 is easily realized, but meanwhile, in the state with the sealing coupling member 14 mounted, by the pressed part 50 being pressed by the clasping groove 88 of the sealing coupling member 14, a full seal is achieved between the overlapping surfaces of the second mounting member 18 and the sealing part 42. With this embodiment, with the outer circumference part of the sealing part 42, gaps are provided to divide this into a plurality on the circumference, but since the gaps are sufficiently small, and the inner circumference part is continuous in the circumference direction, a full seal is achieved for the entire circumference by mounting of the sealing coupling member 14.

As is clear from the above, what "completes the fluid chamber 58 structure by mutually joining the main rubber elastic body 20, the partition member 60, and the flexible film 36" is clearly the "sealing coupling member 14," and the temporary joint member 40, when the seal structure is realized with the sealing coupling member 14, realizes mutual alignment of the main rubber elastic body 20, the partition member 60, and the flexible film 36 reliably and with good precision, and has a sealed state with a low level of practical use that does not take the use environment into consideration. Also, with the "fluid-filled vibration damping device of the present invention for which the main rubber elastic body 20, the partition member 60, and the flexible film 36 are joined to each other" by "the sealing coupling member 14," the temporary joint hook 48 floats from the engaging projection 26 so there is a gap (see FIG. 22B), so a locking function is not exhibited, and specifically, it is clear that there is not a coupling function.

Also, for the joining force for sealing, only the joining force by the sealing coupling member 14 is applied, and this is clear because the temporary joint hook 48 of the temporary joint member 40 does not function after attachment of the sealing coupling member 14. However, the sealing coupling member 14 has a circumference length that does not reach the entire circumference because of a work related reason when manufacturing and attaching, so the temporary joint member 40 is ring shaped along the entire circumference, and via this temporary joint member 40, the joining force of the sealing coupling member 14 is transmitted to the overlapping part of the main rubber elastic body 20 (second mounting member 18), the partition member 60, and the flexible film 36. Naturally, in this case as well, the joining force of the main rubber elastic body 20 (second mounting member 18), the partition member 60, and the flexible film 36 is applied by the sealing coupling member 14, and that is clear from the fact that a gap occurs with the temporary joint hook 48 of the temporary joint member 40 so it does not function.

FIGS. 11 to 15 show an engine mount 100 as a second embodiment of the present invention. With the engine mount 100, there is a constitution for which a sealing coupling member 104 for sealing is mounted on a mount body 102. Also, the mount body 102 has a constitution for which the first mounting member 16 and a second mounting member 108 are elastically connected by the main rubber elastic body 20. With the description below, substantially the same members and parts as those of the first embodiment are given the same code numbers in the drawings, and a description will be omitted.

Figure 16:
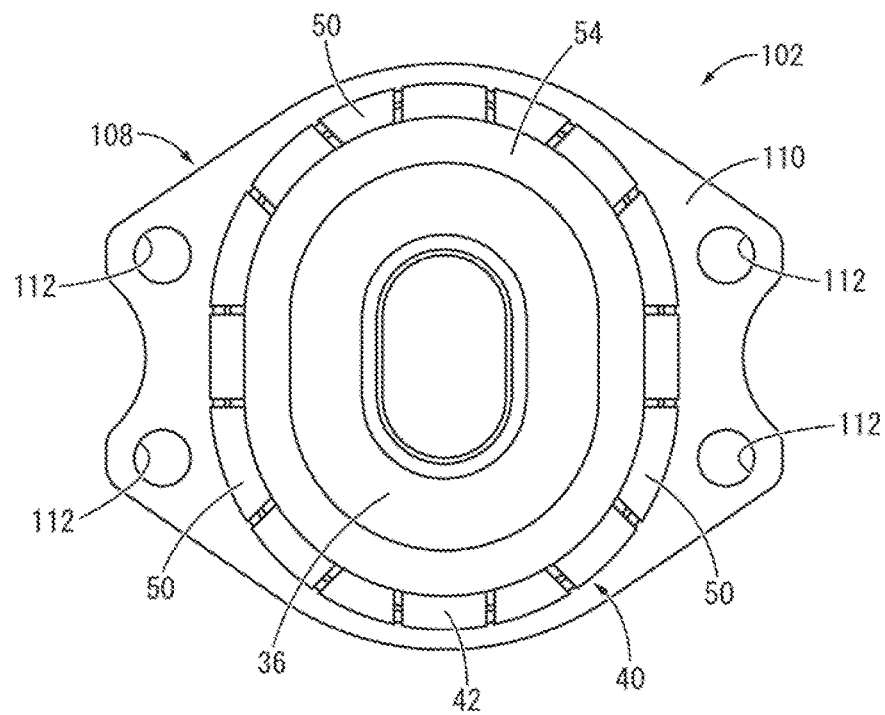
FIG. 16 is a bottom view of a mount body of the engine mount shown in FIG. 11.
Figure 17:
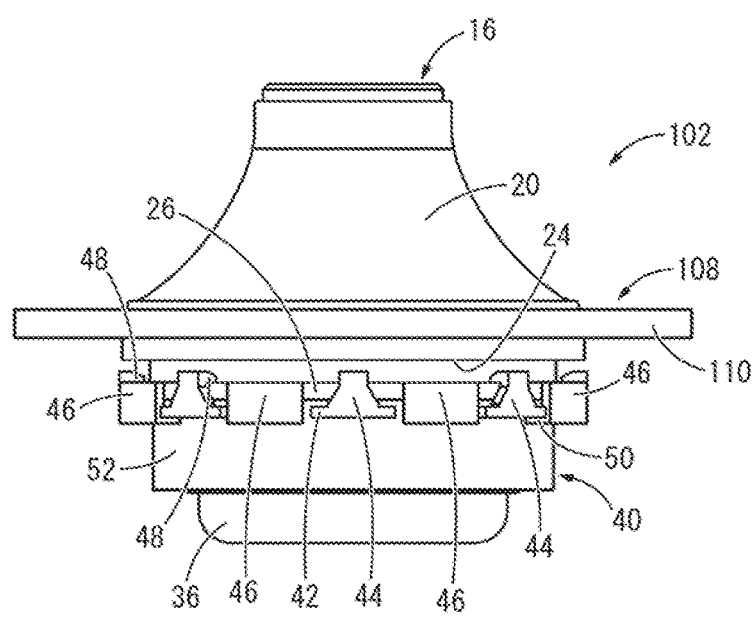
FIG. 17 is a front view of the mount body shown in FIG. 16.

In more specific detail, as shown in FIGS. 16 and 17, the second mounting member 108 is roughly an oval ring shape, with a locking groove 24 formed that opens on the outer circumference surface. Also, with the second mounting member 108 of this embodiment, a fixing flange 110 is integrally formed as an adhering part projecting from the top end part to the outer circumference side, and particularly at both side parts of the minor axial direction projecting greatly (lateral direction in FIG. 14), two fitting holes 112, 112 are formed. With this embodiment, matching the roughly oval ring shape of the second mounting member 108, all of the first mounting member 16, the main rubber elastic body 20, the partition member 60, and the temporary joint member 40 have a roughly oval shape with the axial direction view.

The sealing coupling member 104 is mounted on this mount body 102 constituted equipped with this kind of second mounting member 108. The sealing coupling member 104, as shown in FIGS. 11 to 15, is equipped with a roughly oval tube shaped mounting part 114. At the bottom end part of this mounting part 114, an inner flange shaped pressing part 116 projecting toward the inner circumference side is integrally formed along the entire circumference. The sealing coupling member 104 of this embodiment is formed using a die cast of iron or an aluminum alloy or the like, for example.

Furthermore, the sealing coupling member 104 is equipped with a pair of attachment parts 118, 118. The attachment parts 118 are integrally formed with the mounting part 114, and project toward the outside in the minor axial direction from the mounting part 114, and bolt holes 120 that pierce through in the thickness direction are formed on the projection tip end part. These attachment parts 118, 118 are attached to a vehicle body (not illustrated) by bolts (not illustrated) inserted through each bolt hole 120. Yet further, two fitting convex parts 122, 122 are integrally formed projecting upward on the attachment parts 118. By thinning the boundary part of the mounting part 114 and the attachment part 118 to be concave opening downward, this is made lighter.

Figure 18:
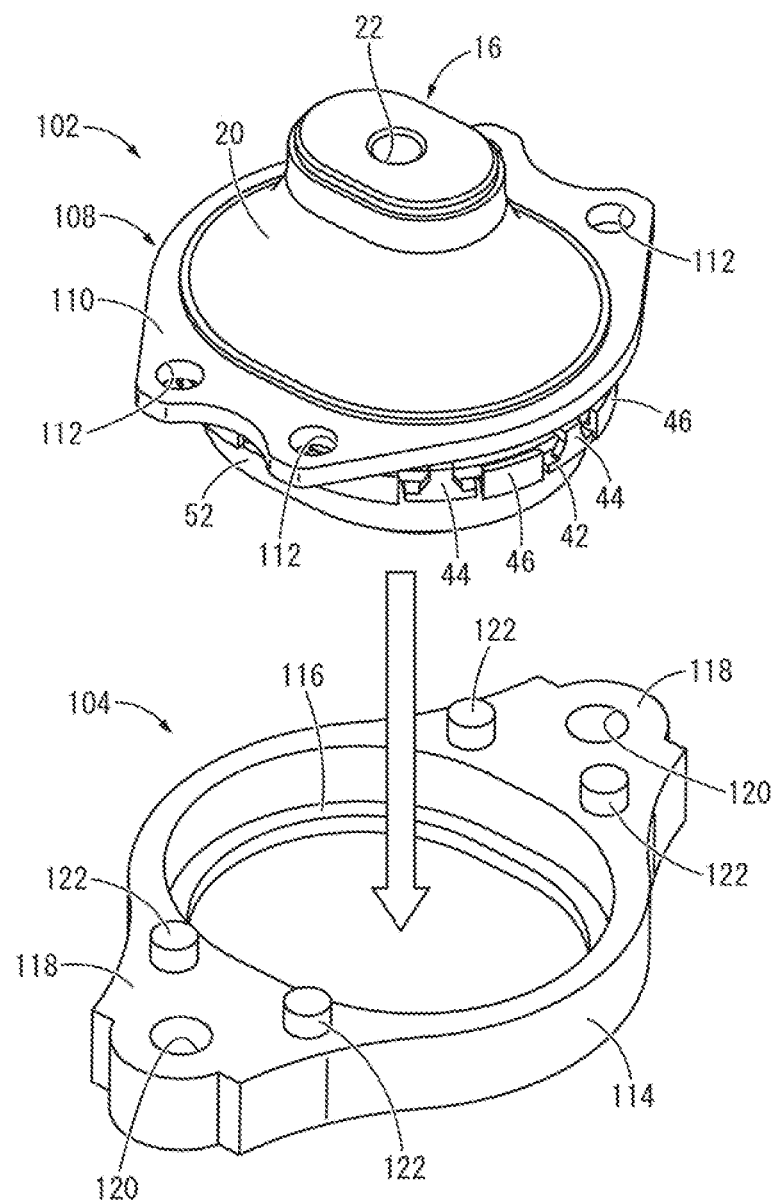
FIG. 18 is a perspective view suitable for explaining the mounting process of a sealing coupling member to the mount body during the manufacturing process of the engine mount shown in FIG. 11.

Also, as shown in FIG. 18, the mount body 102 is inserted in the axial direction from above in relation to the sealing coupling member 104, and the fixing flange 110 of the second mounting member 108 is overlapped on the top surface of the sealing coupling member 104, and the fitting convex part 122 of the sealing coupling member 104 is inserted in the fitting hole 112 of the fixing flange 110. With this embodiment, the fitting convex part 122 inserted in the fitting hole 112 is compressed and undergoes swelling deformation in the axis-perpendicular direction, and by the outer circumference surface of the fitting convex part 122 being pressed against the inner circumference surface of the fitting hole 112, the fitting convex part 122 and the fitting hole 112 are fit to each other, and the second mounting member 108 is fixed to the pair of attachment parts 118, 118 of the sealing coupling member 104. The outer circumference surface of the second mounting member 108 and the inner circumference surface of the mounting part 114 of the sealing coupling member 104 can abut with no gap, but it is also possible for them to be arranged having a gap, and to allow an error tolerance for the member dimensions or attachment or the like.

Here, by the pressing part 116 of the sealing coupling member 104 being pressed from below against the pressed part 50 of the temporary joint member 40, the temporary joint member 40 is relatively displaced in the axial direction in relation to the second mounting member 108. By doing this, pressing force in the direction of overlapping is applied between the second mounting member 108 and the sealing part 42 of the temporary joint member 40, so the compression force of the sealing rubber 34 is increased, and a full seal is achieved between the second mounting member 108 and the sealing part 42. Specifically, the full seal is completed with only the joining force by the sealing coupling member 104, and the temporary joint member 40 is nothing more than for temporary stopping as it says literally, and it substantially loses that effect after attachment of the sealing coupling member 104.

With this embodiment as well, the same as with the first embodiment, by mounting the sealing coupling member 104 on the mount body 102, the compression ratio of the sealing rubber 34 is also increased between the second mounting member 108 and the partition member 60, and also, the compression ratio of the outer circumference end part of the flexible film 36 increases between the temporary joint member 40 and the partition member 60. By doing this, fluid tightness is improved with both the pressure receiving chamber 76 and the equilibrium chamber 78.

As shown with the engine mount 100 constituted according to this kind of embodiment, the mount body 102 and the sealing coupling member 104 can also be made to be attached to each other in the axial direction.

Also, with the engine mount 100, the guide member that aligns the mount body 102 and the sealing coupling member 104 to each other in the axis-perpendicular direction is constituted by having the second mounting member 108 of the mount body 102 and the temporary joint member 40 inserted in the mounting part 114 of the tube shaped sealing coupling member 104. By doing this, the fitting convex part 122 and the fitting hole 112 are easily aligned, and it is possible to easily fix the mount body 102 and the sealing coupling member 104.

Furthermore, by the fitting convex part 122 inserted in the fitting hole 112 being compressed in the axial direction and deformed with an expanding diameter, the outer circumference surface of the fitting convex part 122 is pressed against and fit to the inner circumference surface of the fitting hole 112. Because of that, it is also possible to have the fitting convex part 122 have a slightly smaller diameter than the fitting hole 112, to make the aligning of the fitting convex part 122 and the fitting hole 112 even easier, and to allow dimensional tolerance of the fitting convex part 122 and the fitting hole 112.

Figure 19:
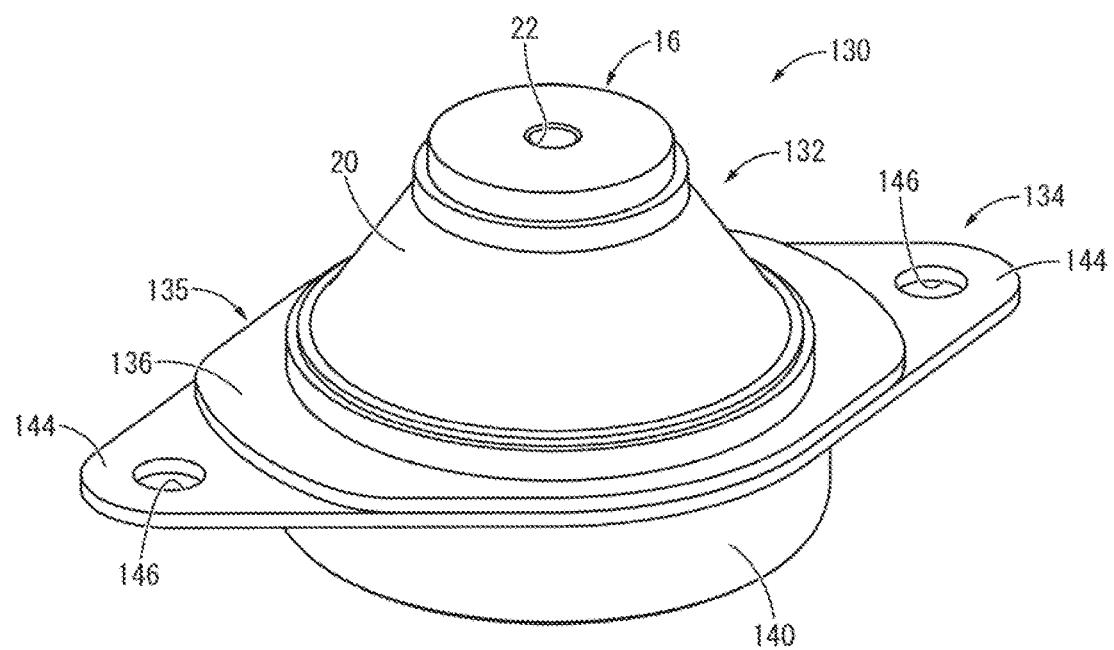
FIG. 19 is a perspective view of an engine mount constituted according to a third embodiment of the present invention.
Figure 20:
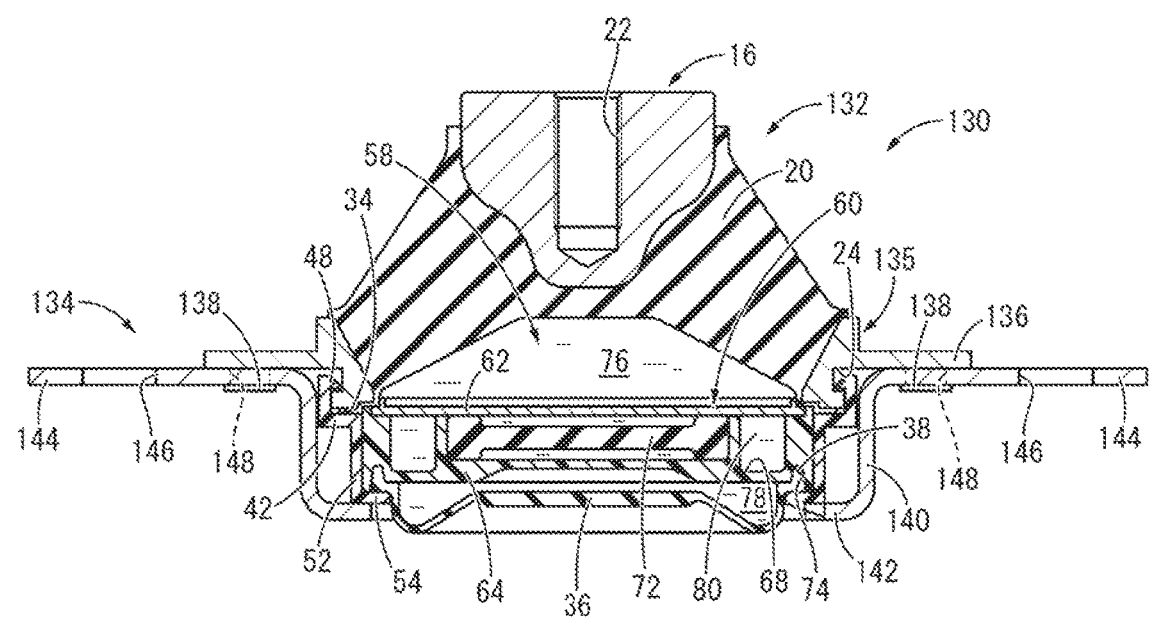
FIG. 20 is a vertical cross section view of the engine mount shown in FIG. 19.

FIGS. 19 and 20 show an engine mount 130 as a third embodiment of the present invention. The engine mount 130 has a constitution by which a sealing coupling member 134 is attached to a mount body 132. The mount body 132 has a constitution for which the first mounting member 16 and a second mounting member 135 are elastically connected by the main rubber elastic body 20.

The second mounting member 135 has a roughly round ring shape equipped with a locking groove 24 that opens at the outer circumference surface, and is equipped with a fixing flange 136 projecting to the outer circumference side. Furthermore, two fitting convex parts 138, 138 projecting facing downward are each integrally formed on both the left and right side parts of the fixing flange 136 for which the projection dimensions are made partially larger.

Meanwhile, the sealing coupling member 134 has a thin walled, large diameter mounting part 140 that exhibits a roughly round tube shape. Furthermore, an inner flange shaped pressing part 142 projecting to the inner circumference side is integrally formed on the bottom end part of the mounting part 140. Yet further, an attaching piece 144 is integrally formed on the top end part of the mounting part 140. This attaching piece 144 projects particularly greatly at both the left and right sides (both sides in the lateral direction in FIG. 20) on the circumference, and a bolt hole 146 and two fitting holes 148, 148 are respectively formed at both left and right sides. The sealing coupling member 134 of this embodiment can be easily formed by doing press processing of a metal plate, for example.

Also, as shown in FIG. 21, the mount body 132 is inserted in the axial direction from above on the mounting part 140 of the sealing coupling member 134, the fixing flange 136 of the second mounting member 135 is overlapped on the top surface of the sealing coupling member 134, and the fitting convex part 138 of the second mounting member 135 is inserted in the fitting hole 148 of the sealing coupling member 134. By the top end part of the fitting convex part 138 being deformed with an expanding diameter and locked to the opening part of the fitting hole 148, the second mounting member 135 is fixed to the sealing coupling member 134.

Figure 22A:
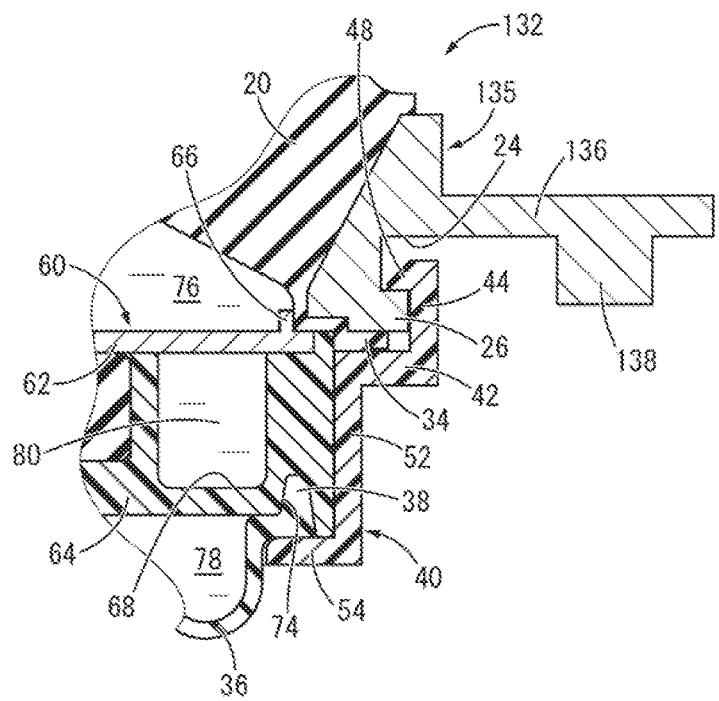
FIGS. 22A and 22B are enlarged cross section views of a principal part, suitable for explaining the seal structure of the engine mount shown in FIG. 19, where
Figure 22B:
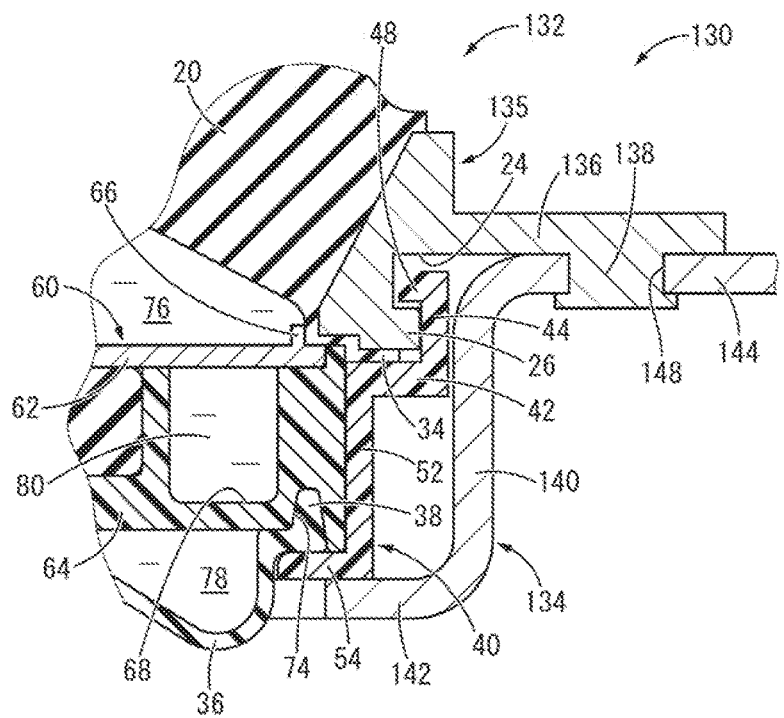
Figure 25:
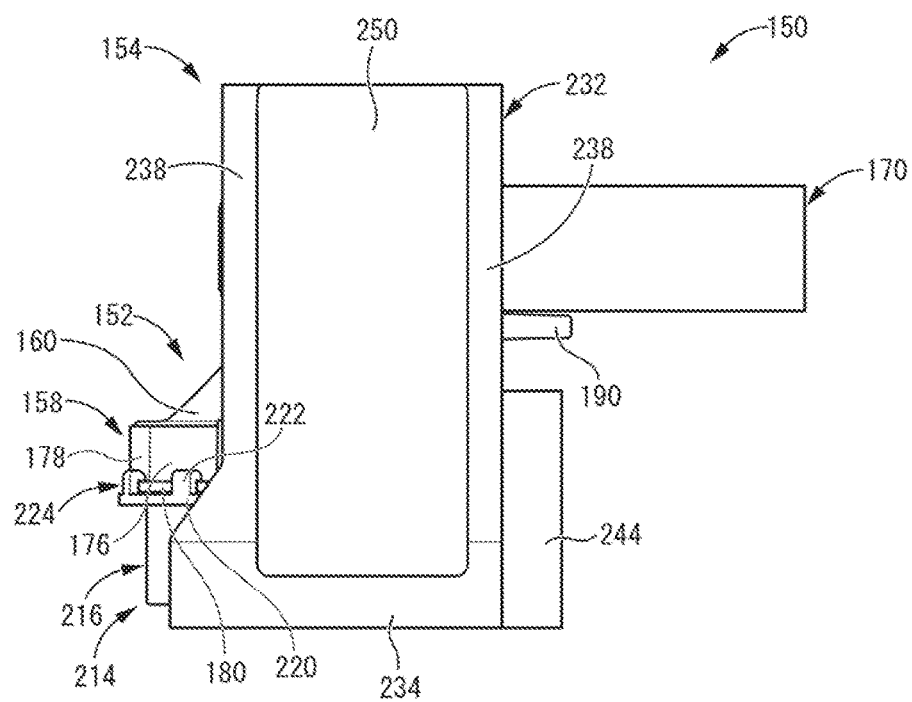
FIG. 25 is a right side view of the engine mount shown in FIG. 23.
Figure 26:
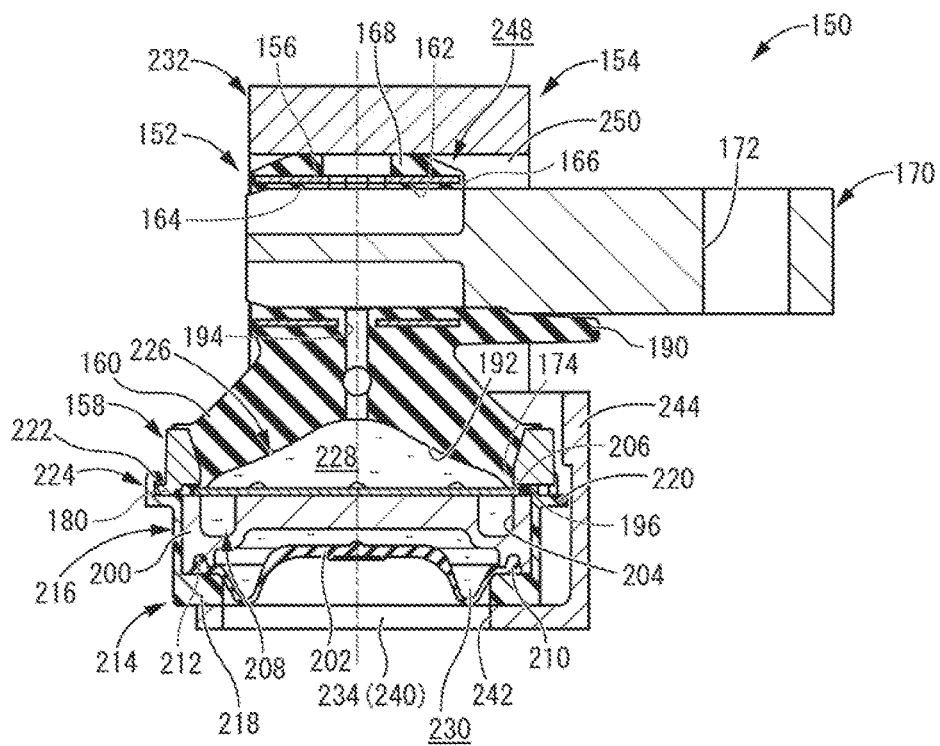
FIG. 26 is a vertical cross section view of the engine mount shown in FIG. 23, taken along line 26-26 of FIG. 28.
Figure 27:
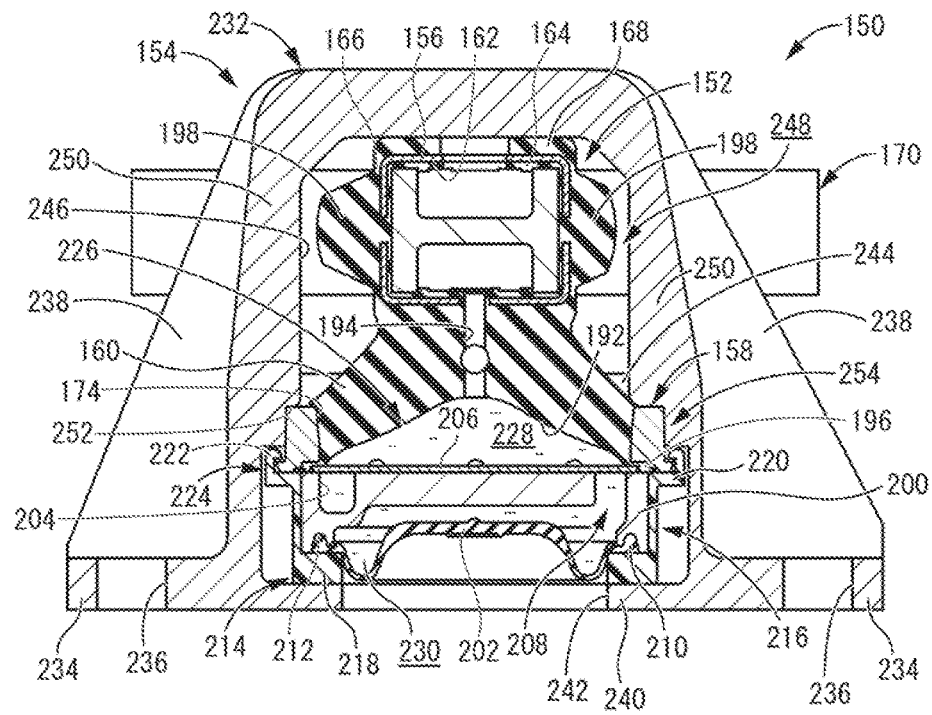
FIG. 27 is a cross section view taken along line 27-27 of FIG. 24.
Figure 28:
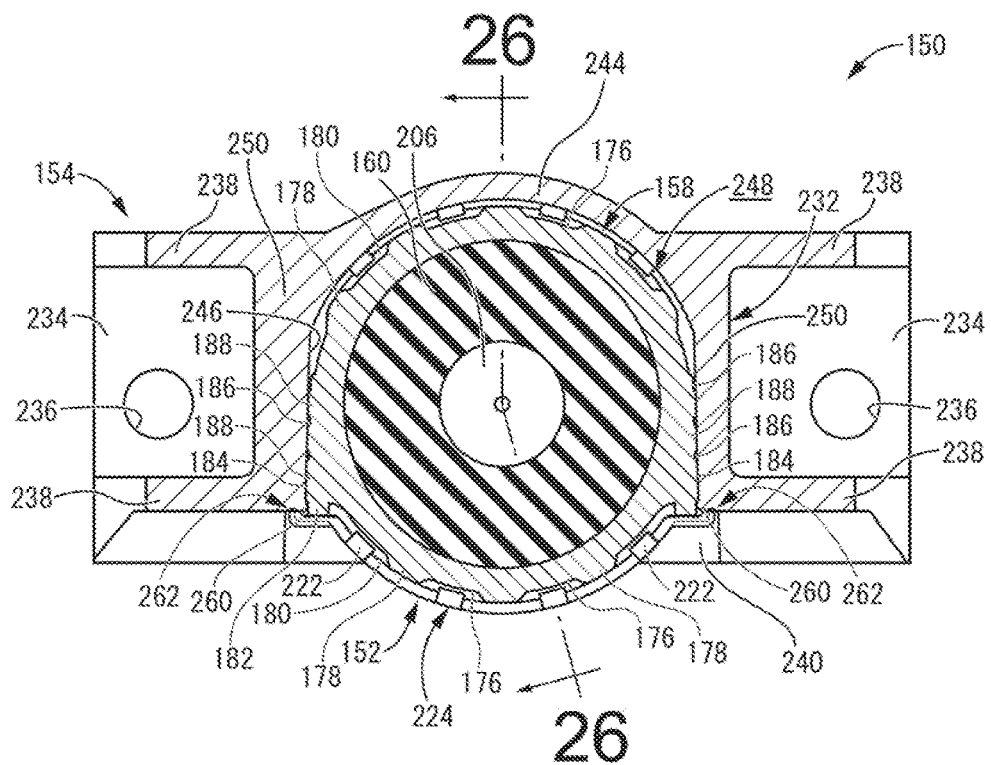
FIG. 28 is a cross section view taken along line 28-28 of FIG. 23.

Here, as shown in FIG. 22A, the full seal as shown in FIG. 22B is achieved between the second mounting member 135 and the temporary joint member 40 that are temporarily sealed by the sealing rubber 34 being clamped at the mount body 132, by mounting of the sealing coupling member 134 to the mount body 132.

Specifically, when the sealing coupling member 134 is mounted on the mount body 132, the pressing part 142 of the sealing coupling member 134 is overlapped in the axial direction on the holding tube part 52 of the temporary joint member 40 and the bottom surface of the presser part 54, and pressing force is applied by the sealing coupling member 134 in the direction of overlapping between the second mounting member 135 and the temporary joint member 40. By doing this, by the sealing coupling member 134 being mounted on the mount body 132, the compression ratio of the sealing rubber 34 between the second mounting member 135 and the sealing part 42 of the temporary joint member 40 is increased, and the full seal is achieved between the second mounting member 135 and the sealing part 42.

With this embodiment as well, the same as with the first and second embodiments, by mounting the sealing coupling member 134 on the mount body 132, the compression ratio of the sealing rubber 34 is also increased between the second mounting member 135 and the partition member 60, and the compression ratio of the outer circumference end part of the flexible film 36 is increased between the temporary joint member 40 and the partition member 60. By doing this, fluid tightness is increased for both the pressure receiving chamber 76 and the equilibrium chamber 78.

With the engine mount 130 constituted according to this kind of embodiment, by the pressing part 142 of the sealing coupling member 134 being overlapped in the axial direction on the presser part 54 of the temporary joint member 40, an approaching direction pressing force is applied between the second mounting member 135 and the sealing part 42 of the temporary joint member 40. By doing this, the full seal is realized without applying external force directly to the coupling part of the second mounting member 135 and the temporary joint member 40. In fact, since the pressing part 142 and the presser part 54 are overlapped along the entire circumference, pressing force is applied along the entire circumference, and it is possible to more advantageously obtain fluid tightness.

Also, the sealing coupling member 134 of this embodiment can be formed easily by press processing, and it is possible to improve lightness and productivity and also realize cost reductions and the like.

Also, with this embodiment, the tip end part of the fitting convex part 138 inserted in the fitting hole 148 is deformed with an expanding diameter, and by being locked in the axial direction on the opening outer edge part of the fitting hole 148, falling out of the fitting convex part 138 from the fitting hole 148 is prevented, and the second mounting member 135 and the sealing coupling member 134 are fixed. With this kind of constitution as well, falling out of the mount body 132 from the sealing coupling member 134 is prevented, and the mounted state can be maintained stably.

Figure 31:
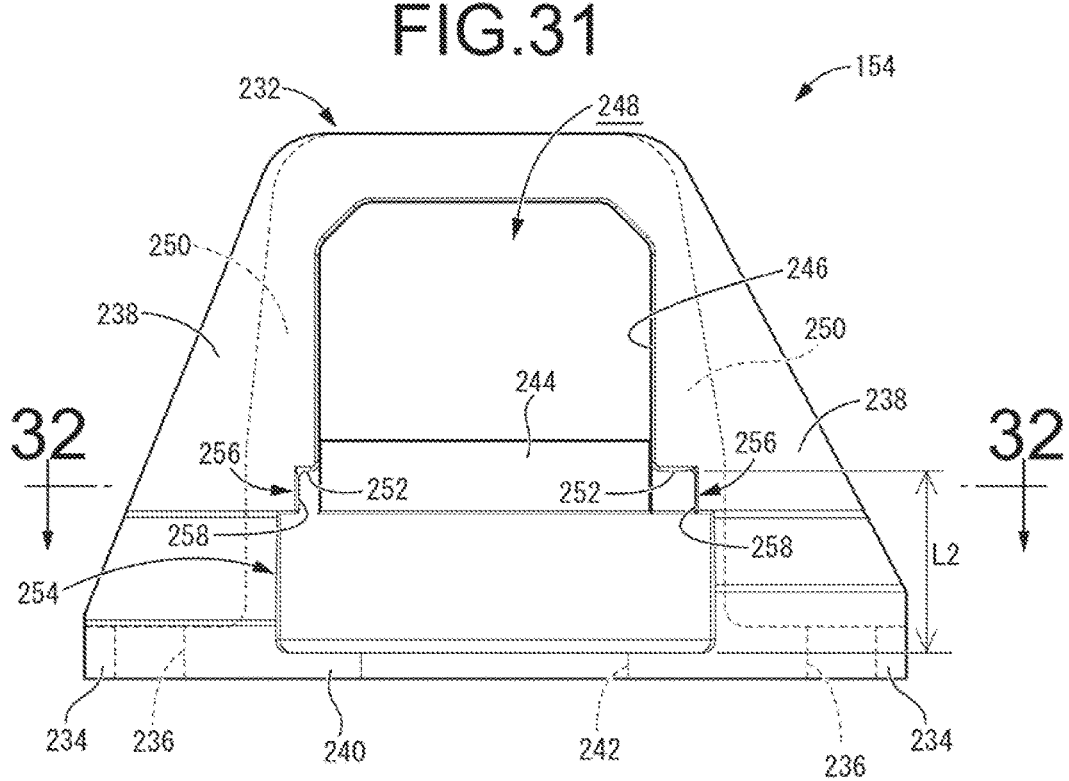
FIG. 31 is a front view of a sealing coupling member of the engine mount shown in FIG. 23.
Figure 32:
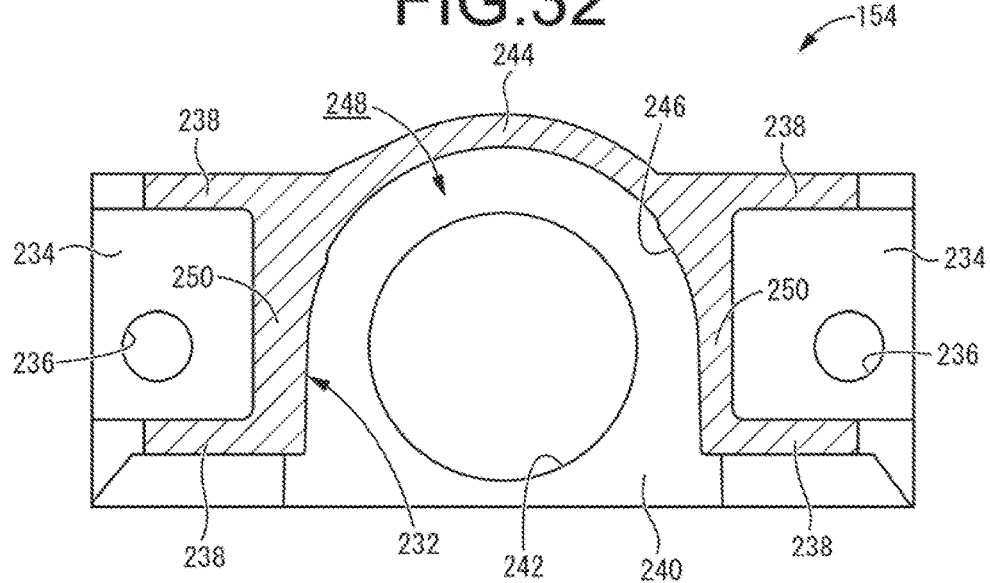
FIG. 32 is a cross section view taken along line 32-32 of FIG. 31.

In FIGS. 23 to 28, an engine mount 150 is shown as a fourth embodiment of the present invention. This engine mount 150 is constituted with a sealing coupling member 154 shown in FIGS. 31 and 32 mounted on a mount body 152 as the vibration damping device main unit shown in FIGS. 29 and 30. With the description hereafter, the vertical direction means as a rule the vertical direction in FIG. 23 which is the mount axial direction.

Figure 29:
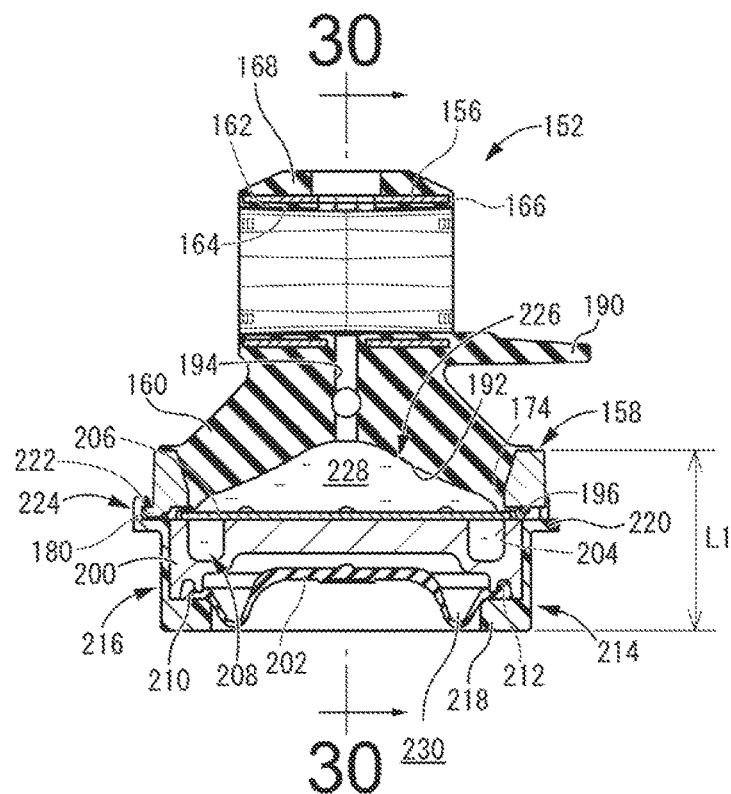
FIG. 29 is a cross section view of a mount body of the engine mount shown in FIG. 23, which corresponds to FIG. 26.
Figure 30:
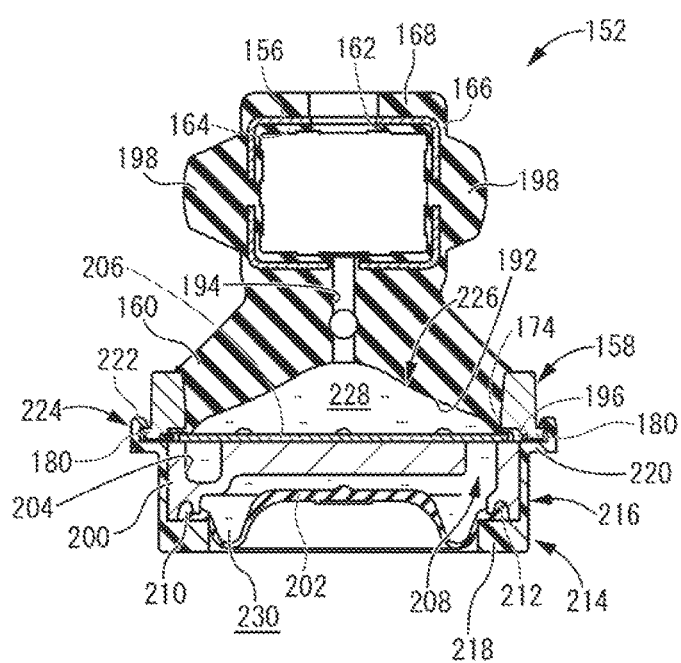
FIG. 30 is a cross section view taken along line 30-30 of FIG. 29.

In more specific detail, as shown in FIGS. 29 and 30, the mount body 152 is constituted so that a first mounting member 156 and a second mounting member 158 are elastically connected to each other by a main rubber elastic body 160.

The first mounting member 156 has a roughly rectangular tube shape equipped with a hollow hole 162 extending straight, and a highly rigid member is used that is formed using iron or an aluminum alloy, a rigid synthetic resin or the like. Also, the first mounting member 156 is arranged with a center axis extending in a direction roughly perpendicular to the mount axial direction. Also, while a fitting rubber layer 164 is formed adhered so as to cover the entire circumference on the inner circumference surface of the first mounting member 156, a covering rubber layer 166 is formed adhered so as to cover the entire circumference on the outer circumference surface of the first mounting member 156. Furthermore, on the upper wall part of the first mounting member 156, a top part buffer rubber layer 168 projecting facing upward in the mount axial direction is integrally formed with the covering rubber layer 166.

Also, as shown in FIGS. 23 to 28, on this first mounting member 156, an inner bracket 170 is attached in a press fitting state from the side so as to be fitted and fixed, and the first mounting member 156 is made to be attached to a power unit via this inner bracket 170. Specifically, on the base end part of the inner bracket 170, while a plurality of insertion holes 172 of the fixing bolts are formed on the power unit side, the tip end part of the inner bracket 170 has a cross section shape roughly in an H shape, and extends linearly with outer circumference dimensions corresponding to the hollow hole 162 of the first mounting member 156.

Also, the second mounting member 158 is a highly rigid member made of metal, and is a thin walled, roughly round ring shape for which large diameter through holes 174 are provided piercing through the center part in the mount axial direction. The inner circumference surface of the second mounting member 158 is a tilted surface that tapers with an expanding diameter facing upward. Also, on the outer circumference side of the second mounting member 158, a plurality of concave recesses 176 extending at a designated length facing the bottom end from the top end of the axial direction are formed separated by a designated gap in the circumference direction, and the places between the adjacent concave recesses 176, 176 in the circumference direction are used as convex parts 178 projecting above the outer circumference surface. Also, at the bottom end part of these concave recesses 176, so as to close the bottom end of the concave recess 176 in an impasse state, a plate shaped locking part 180 that expands in the axis-perpendicular direction is formed extending between adjacent convex parts 178, 178 in the circumference direction.

Furthermore, a pair of fixing parts 182, 182 projecting above the outer circumference surface are integrally formed on the second mounting member 158. This pair of fixing parts 182, 182 respectively have a thick walled, roughly block shape that expand in the axis-perpendicular direction above the outer circumference surface of the second mounting member 158, and are provided at sites opposite to each other in the axis-perpendicular direction at the outer circumference part of the second mounting member 158. Also, the respective pair of fixing parts 182, 182 has outer circumference surfaces 184, 184 extending projecting roughly in parallel in the respective tangential directions from the pair of outer circumference sites opposite to each other in one direction of the radial direction of the second mounting member 158. With this embodiment, the outer circumference surfaces 184, 184 of the pair of fixing parts 182, 182 have tilted surfaces for which a slight tilt angle is given that is several degrees or less in the direction for which they mutually gradually expand outward, as they extend out facing the tangential direction from the opposite facing sites in one direction of the radial direction of the second mounting member 158.

Also, on the outer circumference surface 184 of each fixing part 182, a plurality of groove-shaped recesses 186 as recesses continuously extending along the entire length in the axial direction are provided mutually separated by a designated gap in the extending direction facing the tangential direction. With these groove-shaped recesses 186, the outer circumference surface 184 of the fixing part 182 is constituted by a plurality of abutting projections 188 divided with a designated distance in the extending direction, said another way, the direction for which the fixing part 182 is inserted in the clasping groove 254 described later, and with this embodiment, on the respective outer circumference surfaces 184, three groove-shaped recesses 186, 186, and 186 and three abutting projections 188, 188, and 188 are formed.

Also, the first mounting member 156 is arranged separated by a designated distance upward above the center axis of the second mounting member 158, and the first mounting member 156 and the second mounting member 158 are mutually elastically connected by the main rubber elastic body 160. The main rubber elastic body 160 has a thick walled, large diameter, roughly conical trapezoid shape, the first mounting member 156 is adhered by vulcanization to the end part of the small diameter side, and the inner circumference surface of the second mounting member 158 is adhered by vulcanization to the outer circumference surface of the end part of the large diameter side.

The fitting rubber layer 164, the covering rubber layer 166, and the top part buffer rubber layer 168 adhered to the outer circumference surface of the first mounting member 156 are formed as an integrated unit on the main rubber elastic body 160. Also, the main rubber elastic body 160 is formed as an integrally vulcanized molded component equipped with the first mounting member 156 and the second mounting member 158.

Also, a bottom part buffer rubber layer 190 of a designated thickness is integrally formed on the main rubber elastic body 160 extending out in a tongue shape or flat plate shape facing in the axial direction outward from the bottom wall part at the opening edge part of one first mounting member 156 at the small diameter side end part vicinity. Yet further, a large diameter recess 192 is formed on the main rubber elastic body 160. The large diameter recess 192 is a recess exhibiting a reverse facing, roughly mortar shape, and opens at the end surface of the large diameter side of the main rubber elastic body 160. Also, an injection hole 194 extending piercing through the inside and outside is provided on the main rubber elastic body 160. This injection hole 194 extends linearly with a fixed circular cross section on the main elastic axis of the main rubber elastic body 160, and from the inside opening part provided at the center of the upper bottom part of the large diameter recess 192, extends to the outside opening part provided on the inside of the hollow hole 162 piercing through the first mounting member 156.

Furthermore, a sealing rubber 196 as a sealing member is formed on the outer circumference side of the large diameter recess 192 of the main rubber elastic body 160. The sealing rubber 196 is a thin walled rubber layer adhered so as to cover the bottom surface of the second mounting member 158, and with this embodiment, is integrally formed with the main rubber elastic body 160, and covers roughly the entire surface of the inner circumference side of the locking part 180 at the bottom surface of the second mounting member 158.

Yet further, a pair of side buffer rubber layers 198, 198 projecting to outside the first mounting member 156 is formed on the covering rubber layer 166 of the main rubber elastic body 160. The side buffer rubber layers 198, 198 project respectively in the reverse to the direction (lateral direction in FIG. 23) orthogonal to the extending direction (lateral direction in FIG. 26) of the hollow hole 162 of the first mounting member 156. The side buffer rubber layers 198, 198 are mountain shapes having a roughly trapezoidal cross section, and as shown in FIG. 23, in the stand alone state of the engine mount 150, a gap of a designated distance is formed between the projection tip end surfaces of the side buffer rubber layers 198, 198 and the opposite facing surfaces of the circumferential wall inner surface 246 of the mount holder part 248 described later.

Also, on the second mounting member 158 constituting an integrally vulcanized molded component of the main rubber elastic body 160, a partition member 200 and a flexible film 202 are arranged overlapping on the bottom side. Said another way, at the mount center axial direction of the second mounting member 158, the partition member 200 and the flexible film 202 are arranged overlapping at the side opposite the side at which the main rubber elastic body 160 is arranged.

The partition member 200 overall has a thick walled, roughly large diameter round disk shape, and is formed using metal or a hard synthetic resin or the like. Also, on the partition member 200, a circumferential groove 204 that extends at a length slightly less than roughly one circumference of the circumference direction for the outer circumference part is formed open at the top surface. Also, a thin walled, round disk shaped cover plate 206 is overlapped on the top surface of the partition member 200, and by the opening of the circumferential groove 204 being covered, an orifice passage 208 that extends in the circumference direction is formed. One end part of the circumference direction of this orifice passage 208 pierces through the partition member 200 and is made to open downward, and the other end part of the circumference direction pierces through the cover plate 206 and is made to open upward.

Meanwhile, the flexible film 202 overall is constituted by a rubber elastic film or easily deformable resin film or the like that has a thin walled roughly round disk shape, and by providing a designated slack at the center part in the radial direction, elastic deformation is allowed easily. Also, a thin walled annular seal part 210 is integrally formed on the outer circumference edge of the flexible film 202. Also, by the annular seal part 210 being overlapped in a closely adhered state on the bottom surface of the outer circumference part of the partition member 200, the flexible film 202 is arranged so as to cover along the entirety of the bottom surface of the partition member 200. On the outer circumference part of the partition member 200, an annular positioning groove 212 extending in the circumference direction is formed open to the bottom surface, and the top end of the annular seal part 210 is set so as to enter into this positioning groove 212.

Also, on these mutually overlapped partition member 200 and flexible film 202, a temporary joint member 214 is further attached so as to cover their outer circumference surface.

The temporary joint member 214 has an overall roughly round disk shape, and is formed using a hard synthetic resin, metal or the like. A cylindrical part 216 of the temporary joint member 214 is roughly the same or slightly smaller than the axial length of the partition member 200, and on the bottom end opening part, an inner flange shaped annular abutting part 218 that expands to the inner circumference side is integrally formed with the bottom end opening part.

Also, on the top end opening part of the cylindrical part 216 of the temporary joint member 214, an outer flange shaped sealing part 220 that expands to the outer circumference side is formed. Yet further, on the outer circumference edge of the sealing part 220, at a plurality of locations on the circumference, hook shaped locking parts 224 are formed that project facing upward, and that have locking projections 222 provided on the inner circumference surface near the projection tip.

Also, the cylindrical part 216 of the temporary joint member 214 is externally fitted onto the partition member 200, and on the annular abutting part 218 of the temporary joint member 214, the annular seal part 210 of the flexible film 202 is sandwiched and held between the bottom end surface of the installed partition member 200. Also, the sealing part 220 of the temporary joint member 214 is overlapped on the bottom end surface of the locking part 180 on the second mounting member 158, and each locking part 224 is made to project upward above the outer circumference surface of the second mounting member 158. Furthermore, each locking part 224 is aligned respectively to concave recesses 176 on the circumference of the second mounting member 158, and the locking projection 222 of each locking part 224 is respectively locked to the locking part 180 of the second mounting member 158.

By the temporary joint member 214 being attached to the second mounting member 158 by the locking action of the locking part 224 on the locking part 180 in this way, the partition member 200 and flexible film 202 in a housed state aligned inside the temporary joint member 214 are attached overlapping on the bottom side of the second mounting member 158. Also, between axially opposed surfaces of the large diameter recess 192 of the main rubber elastic body 160 and the flexible film 202, a fluid chamber 226 is defined that is sealed fluid tightly in relation to the eternal space and in which non-compressible fluid is sealed. By doing this, the mount body 152 of this embodiment is a fluid-filled type vibration damping device.

Also, this fluid chamber 226 is partitioned by the partition member 200, and on the top side of the partition member 200, formed is a pressure receiving chamber 228 for which a portion of the wall part is constituted by the main rubber elastic body 160, and for which pressure fluctuation is directly caused based on elastic deformation of the main rubber elastic body 160 when vibration is input to roughly the mount axial direction between the first and second mounting members 156 and 158. Meanwhile, on the bottom side of the partition member 200, formed is an equilibrium chamber 230 for which a portion of the wall part is constituted by the flexible film 202, and for which the internal pressure fluctuation can be absorbed and reduced based on the flexible deformation of the flexible film 202.

Yet further, the pressure receiving chamber 228 and the equilibrium chamber 230 are in communication with each other through the orifice passage 208 formed on the partition member 200, and sealing fluid is made to flow through the orifice passage 208 based on the relative pressure fluctuation of the pressure receiving chamber 228 and the equilibrium chamber 230. Thus, using the resonance action or the like of the fluid that flows in the orifice passage 208, the vibration damping effect is made to be exhibited on input vibration.

The injection of non-compressible fluid into the fluid chamber 226 can be realized also by, for example, performing the attachment of the partition member 200 or the flexible film 202 and the temporary joint member 214 on the integrally vulcanized molded component of the main rubber elastic body 160 inside non-compressible fluid or the like, but with this embodiment, can be done by, after attaching those members, injecting non-compressible fluid through an injection hole 194, and after that, press fitting and adhering a spherical body for sealing into the injection hole 194.

Here, in a state with the partition member 200 or the flexible film 202 and the temporary joint member 214 attached to the integrally vulcanized molded component of the main rubber elastic body 160, specifically, with the mount body 152 in a stand-alone state before attaching it to the bottom side part of the sealing coupling member 154, sealing in relation to the external space of the fluid chamber 226 is realized by a temporary seal using the locking action of the temporary joint member 214 on the second mounting member 158.

Specifically, with the temporary joint member 214, the partition member 200 sandwiches the annular seal part 210 of the flexible film 202 and overlaps it in relation to the annular abutting part 218, and it is possible to apply axial direction pressing force on the annular seal part 210 between the annular abutting part 218 and the partition member 200. Also, the sealing part 220 of the temporary joint member 214 sandwiches the sealing rubber 196 and overlaps in relation to the bottom end surface of the second mounting member 158 further to the inner circumference side than the locking part 180, and it is possible to apply axial direction pressing force on the sealing rubber 196 between the sealing part 220 and the second mounting member 158.

By doing this, the reaction force that presses the annular seal part 210 and the sealing rubber 196 in the axial direction is applied facing downward in the axial direction of the temporary joint member 214. Also, in resistance to this pressing reaction force, the locking part 224 of the temporary joint member 214 is locked to the locking part 180 of the second mounting member 158, and the temporary joint member 214 is held at a position approaching the second mounting member 158 in the axial direction position. As a result, using the locking force of the temporary joint member 214 in relation to the second mounting member 158, sealing pressure in the axial direction is applied to the annular seal part 210 and the sealing rubber 196, and by these seal parts 196 and 210, a fluid tight temporary seal is respectively achieved between the second mounting member 158 and the partition member 200, and between the partition member 200 and the temporary joint member 214, and the fluid tightness of the fluid chamber 226 is maintained. Therefore, with this embodiment, the locking means that locks the temporary joint member 214 to the second mounting member 158 is constituted by the locking part 180 and the locking part 224, and the fluid chamber 226 is temporarily sealed fluid tightly using this locking means.

With this embodiment, by also having the sealing rubber 196 sandwiched between overlapping surfaces of the partition member 200 and the second mounting member 158 at the outer circumference edge of the cover plate 206, the state of the cover plate 206 being tightly adhered and overlapping the partition member 200 is kept, and the sealing properties are improved.

On the mount body 152 constituted as described above, the sealing coupling member 154 is attached, and attachment is done by the mount body 152 being inserted from the side into the installation space formed at roughly the center of the sealing coupling member 154. The sealing coupling member 154 is a highly rigid member formed using iron or aluminum alloy or the like, and because it is light, easy to ensure rigidity by the member thickness, and there is a great degree of freedom of design and the like, die cast molded components made of aluminum alloy can be suitably used.

In more detail, as shown in FIGS. 23 to 28 and FIGS. 31 and 32, the sealing coupling member 154 has a gate-shaped part 232 provided straddling the installation space, and a pair of attachment parts 234, 234 with a flat plate shape expanding in the direction mutually separating are provided on both leg bottom ends of the gate-shaped part 232. On the respective attachment parts 234, 234 are formed insertion holes 236 through which fixing bolts are inserted, and by the fixing bolts inserted through the insertion hole 236, it is possible to fix using bolts the sealing coupling member 154 to the vehicle body Also, between both leg parts of the gate-shaped part 232 and each of the attachment parts 234, reinforcing ribs 238, 238 that connect both edges in the member width direction are respectively formed as an integral unit. Specifically, with this embodiment, the sealing coupling member 154 is constituted by the bracket metal fitting for attaching the second mounting member 158 to the vehicle body which is one subject of vibration damping connection.

Also, on the bottom end opening part of the gate-shaped part 232, a pressing part 240 that expands straddling between the pair of attachment parts 234, 234 is integrally formed. A round through hole 242 is formed at the center part of the pressing part 240, and the inner diameter dimensions of this through hole 242 are roughly the same as the inner diameter dimensions of the annular abutting part 218 of the temporary joint member 214 of the mount body 152.

Yet further, a mounting part 244 made to cover the bottom side part of the opening of one side is integrally formed on the gate-shaped part 232. This mounting part 244 is bent in roughly an arc shape roughly concentrically with the through hole 242 of the pressing part 240, and projects facing outward from the opening of one side of the gate-shaped part 232.

Also, by this mounting part 244 being provided, at the bottom side part of the gate-shaped part 232, a mount holder part 248 is formed as an installation space equipped with a roughly arc shaped circumferential wall inner surface 246 that extends with the length of half a circumference or greater in the circumference direction, and the pressing part 240 that has the through hole 242. This mount holder part 248 opens facing the side opposite the mounting part 244, and the opening part is the insertion port through which the mount body 152 is inserted and attached.

Also, on the circumferential wall inner surface 246 of the mount holder part 248, at the opposite facing inner surface of the pair of leg parts 250, 250 of the gate-shaped part 232, a step shaped pressing upper surface 252 is formed facing opposite the top surface of the pressing part 240 in the vertical direction. Also, between the facing surfaces of the top surface of the pressing part 240 and the pressing upper surface 252, clasping grooves 254, 254 are formed to be open facing the insertion port.

With this embodiment, at the inner surface of the pair of leg parts 250, 250 with the mount holder part 248, a step 256 that extends along roughly the entire length of the width direction (vertical direction in FIG. 28) of the leg part 250 in the height direction middle part is formed, and the pressing part 240 side lower than the step 256 has a larger diameter inner circumference surface shape than that of the pressing upper surface 252 side higher than the step 256.

Also, groove bottom surfaces 258, 258 of the clasping grooves 254, 254 formed on the opposite facing inner surfaces of the pair of leg parts 250, 250 of the gate-shaped part 232 are tilted surfaces that open and flare out, so that the distance between the opposing surfaces gradually becomes larger toward the insertion port side of the mount body 152 of the mount holder part 248. Also, the tilt angle of these tilted groove bottom surfaces 258, 258 is roughly the same, corresponding to that of the pair of outer circumference surfaces 184, 184 of the pair of fixing parts 182, 182 of the second mounting member 158 of the mount body 152.

Figure 33:
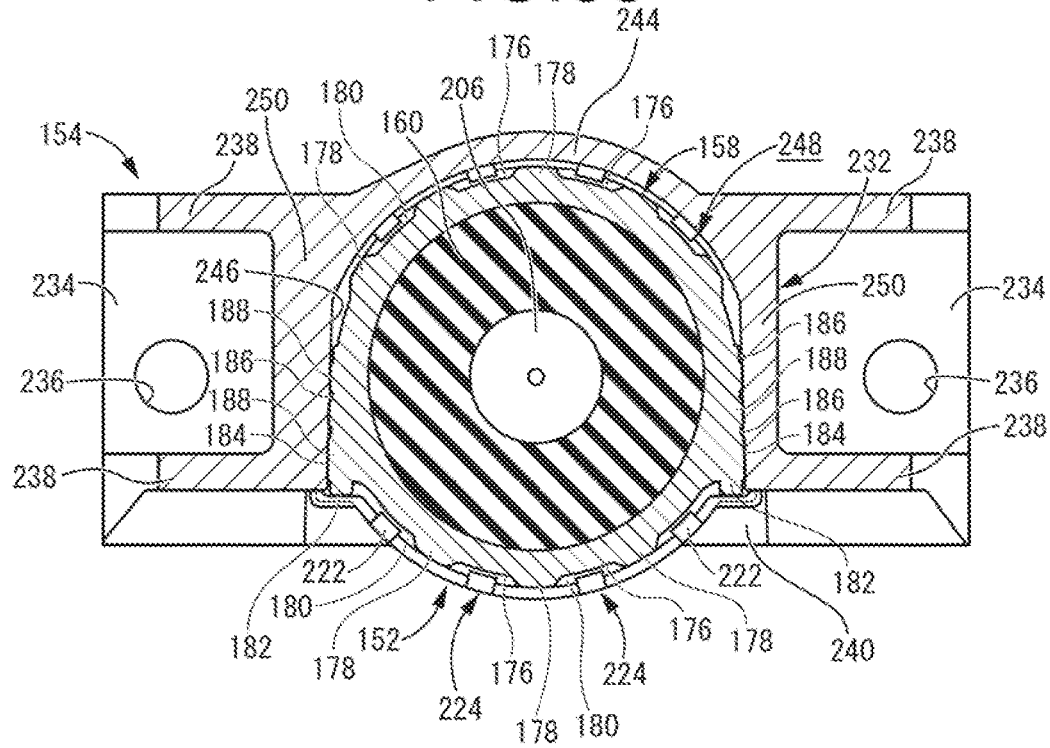
FIG. 33 is a cross section view corresponding to FIG. 28, suitable for explaining the attachment process of the sealing coupling member to the mount body.

Also, as shown in FIG. 33, on the sealing coupling member 154 constituted in this way, the mount body 152 is inserted from the side of the mount holder part 248 and attached. Also, the part that is further to the axial direction lower side than the second mounting member 158 of the mount body 152 is fit into the clasping groove 254 from the insertion port to be fit and fixed.

Specifically, by the pair of fixing parts 182, 182 with the second mounting member 158 being inserted from the insertion port in the clasping grooves 254, 254, the outer circumference surfaces 184, 184 of each fixing part 182, 182 is abutted against each groove bottom surface 258, 258 of the clasping grooves 254, 254. By doing this, each fixing part 182, 182 is fit and fixed in a press fitting state in relation to each clasping groove 254, 254. In particular with this embodiment, the fixing parts 182, 182 are each equipped with three abutting projections 188, 188, 188, and each of the abutting projections 188 is abutted against the respective one of the groove bottom surfaces 258, 258 and a fitting and fixing area is set. By doing this, it is possible to stably obtain fitting and fixing of the mount body 152 on the mount holder part 248.

Also, with this embodiment, each groove bottom surface 258, 258 of the clasping grooves 254, 254 is a tilted surface, and at the time of demolding during molding of the sealing coupling member 154, this is used as a mold removal taper. By doing this, the work of die cast molding of the sealing coupling member 154 is one level easier.

Furthermore, with the mount body 152, by being fit into the clasping groove 254 of the sealing coupling member 154, a pressing force is applied in the mutually approaching direction in the axial direction on the second mounting member 158 and the temporary joint member 214. Specifically, as shown in FIGS. 29 and 30, with the mount body 152 alone, in relation to the locking part 180 of the second mounting member 158, the locking part 224 of the temporary joint member 214 exhibits a locking action in resistance to the pressing reaction force of the sealing rubber 196 and the annular seal part 210 in the temporarily sealed state. Compared to the mount axial direction distance L1 (see FIG. 29) between the top end surface of the second mounting member 158 and the bottom end surface of the temporary joint member 214 in the temporarily sealed state, the distance L2 (see FIG. 31) between the opposite facing surfaces of the top surface of the pressing part 240 and the pressing upper surface 252 of the clasping groove 254 of the sealing coupling member 154 is set to be smaller.

Figure 34:
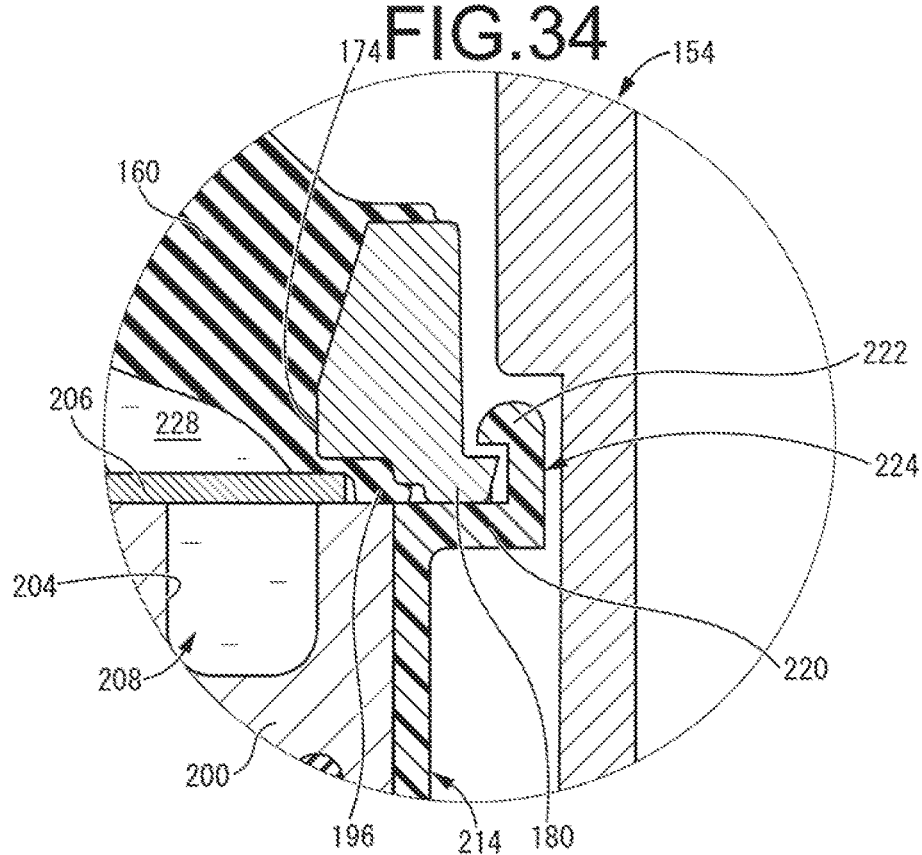
FIG. 34 is a cross section view showing an enlarged view of the seal part of the engine mount shown in FIG. 23.

By doing this, when the mount body 152 in a temporarily sealed state is fit into the clasping groove 254 of the sealing coupling member 154, as shown by the enlarged view in FIG. 34, the second mounting member 158 and the temporary joint member 214 are further displaced relative to each other in a mutually approaching direction in the mount axial direction, and further compression is applied to the sealing rubber 196 and the annular seal part 210 by that amount. In this state, by the second mounting member 158 of the mount body 152 being attached and fixed to the sealing coupling member 154, a full seal state is achieved and high level fluid tightness is set for the fluid chamber 226.

Here, with this embodiment, the pressing part 240 of the sealing coupling member 154 is pressed on the annular abutting part 218 of the temporary joint member 214 along the entire circumference on the circumference at the bottom surface of the temporary joint member 214. Meanwhile, the pressing upper surface 252 of the clasping groove 254 is pressed on the top surface of the second mounting member 158 partially on the circumference of the second mounting member 158.

As is also clear from FIG. 34, in this full sealed state, it is not necessary for the locking action of the locking part 180 and the locking part 224 to function. Because of that, for the locking structure of the locking part 180 and the locking part 224, it is sufficient to have performance of a strength or the like by the amount that can temporarily fulfill the sealing performance required for the temporary seal state.

Also, after the mount body 152 is inserted from the side in the sealing coupling member 154 as described above, on the bottom wall part of the clasping groove 254 of the sealing coupling member 154, a caulking engaging part 260 is formed on the second mounting member 158 of the mount body 152, and the fixing parts 182, 182 of the second mounting member 158 are prevented from falling out of the clasping grooves 254, 254 of the sealing coupling member 154.

Figure 35:
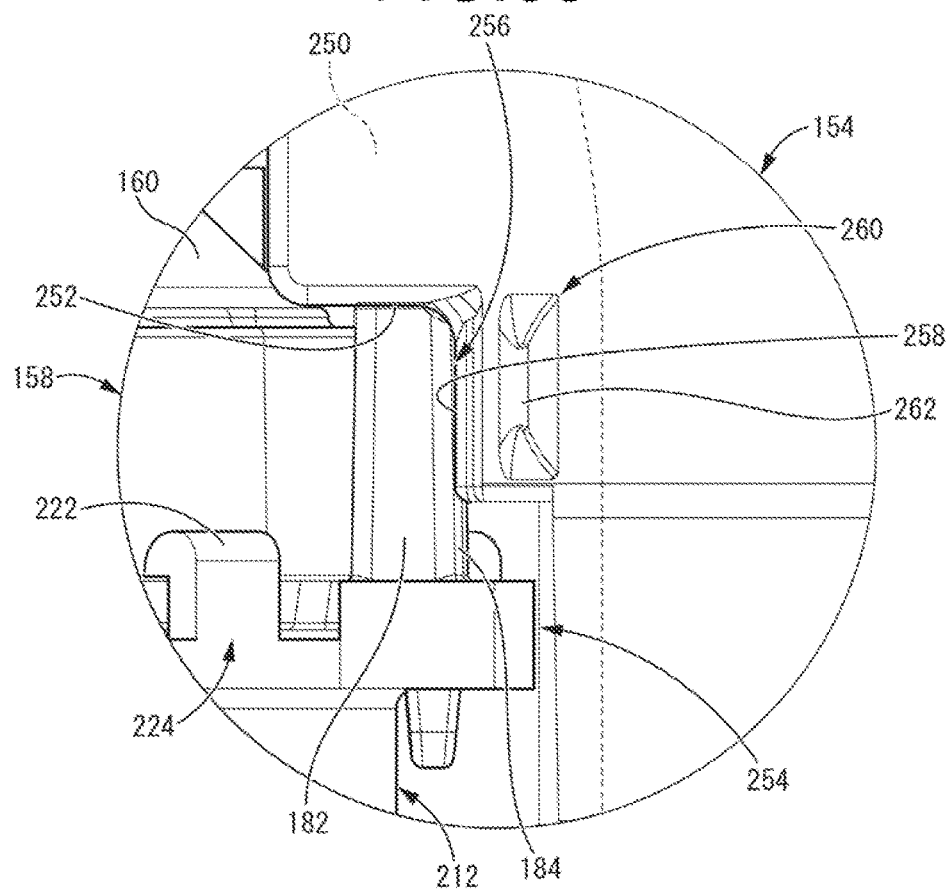
FIG. 35 is a front view showing an enlarged view of a caulking engaging part of the engine mount shown in FIG. 23.
Figure 36:
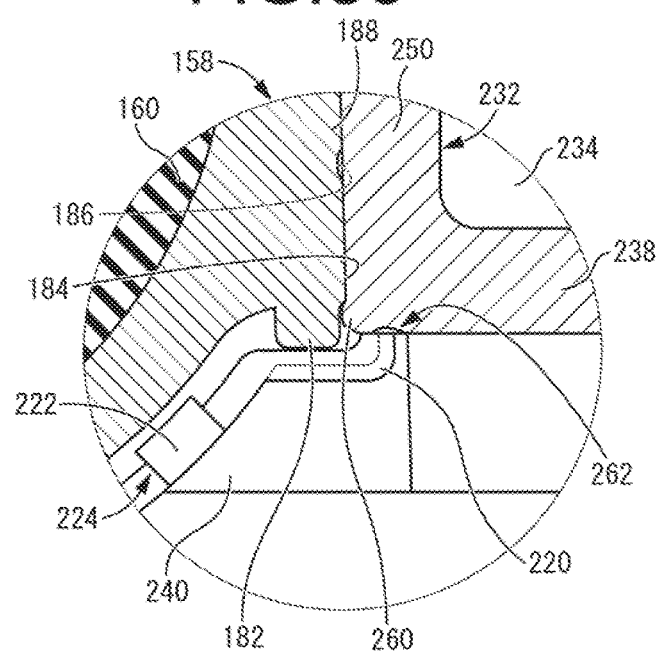
FIG. 36 is a cross section view showing an enlarged view of the caulking engaging part of the engine mount shown in FIG. 23.

As shown in the enlarged view in FIGS. 35 and 36, this caulking engaging part 260 is formed by implementing crushing and caulking processing at the positions near the outside of the groove bottom surfaces 258, 258 of the insertion port of the clasping grooves 254, 254 with both leg parts 250, 250 of the gate-shaped part 232 with the sealing coupling member 154. The crushing and caulking process can be performed by using a punch having a tip end shape corresponding to a target concave crushed part 262 to apply impact force or pressing force.

Specifically, by the concave crushed part 262 being formed with the crushing and caulking process, a volume corresponding to the crushed part 262 is plastically deformed to swell toward the groove bottom surface 258 side of the nearby clasping groove 254. As a result, the caulking engaging part 260 pulled out so as to cover that from the outside in relation to the back end surface of the fixing part 182 with the second mounting member 158 press-fit fitted on the clasping groove 254 is formed as an integrated unit with the opening part of the insertion port with the sealing coupling member 154.

By the engaging action of this caulking engaging part 260 to the fixing part 182, falling out of the fixing part 182 from the clasping groove 254 in the backward direction of insertion is prevented, and it is possible to maintain the mount body 152 reliably in an attached state inside the mount holder part 248.

In particular with this embodiment, as shown in FIG. 35, with the concave crushed part 262 formed by the crushing and caulking process, a trough line extending in the vertical direction along the groove bottom surface 258 is set as the deepest position. There is an asymmetrical inner surface shape for which, in the lateral width direction in FIG. 35 of the crushed part 262, the position of this trough line is biased further to the groove bottom surface 258 side of the clasping groove 254 than the center of the crushed part 262.

By doing this, with the plastic deformation according to the crushing and caulking process, the back end part of the fixing part 182 efficiently undergoes thickness deviation to the clasping groove 254 side, and the caulking engaging part 260 can be efficiently formed at a sufficiently large size.

In particular, by using this kind of crushing and caulking process when holding the mount body 152, since it is not necessary to bend or reduce the diameter of the bracket or the like such as with bend caulking, for example, it is possible to sufficiently ensure member thickness of the engaging member, and it is possible to increase the durability of the bracket, and thus the vibration damping device. Also, it is possible to easily execute the caulking operation compared with bending caulking and the like, so manufacturing efficiency of the vibration damping device is increased.

The mount body 152 constituted in this way is inserted from the insertion port side to the mount holder part 248 on the sealing coupling member 154, and the mount body 152 is attached to the sealing coupling member 154. Also, the inner bracket 170 is inserted from the tip end side to the hollow hole 162 of the first mounting member 156 for these attached bodies, constituting the engine mount 150.

In more specific detail, in the hollow hole 162 of the first mounting member 156, the tip end side of the inner bracket 170 is inserted from the direction opposite to the insertion direction of the mount body 152 to the sealing coupling member 154. The fitting rubber layer 164 is formed by adhesion on the inner surface of the hollow hole 162, and the outer circumference dimension of the tip end part of the inner bracket 170 is roughly equal to the dimension of the hollow hole 162, so the inner bracket 170 is inserted in the hollow hole 162 abutting the fitting rubber layer 164, or with the fitting rubber layer 164 slightly compressed. By doing this, the inner bracket 170 and the first mounting member 156 abut in a tightly adhered state via the fitting rubber layer 164, and by the friction action of the inner bracket 170 and the fitting rubber layer 164, it is possible to effectively prevent falling out of the inner bracket 170 from the first mounting member 156.

Also, as is also shown in FIG. 23, with the engine mount 150 for which the mount body 152, the sealing coupling member 154, and the inner bracket 170 are attached, the top part buffer rubber layer 168 formed on the top side of the first mounting member 156 is compressed, and is pressed against the upper surface of the inner surface of the gate-shaped part 232 with the sealing coupling member 154.

With the engine mount 150 constituted as noted above, while bolts are inserted in the insertion holes 172 of the inner bracket 170 to be fixed to the power unit, bolts are also inserted in the insertion holes 236 of the sealing coupling member 154 to be fixed to the vehicle body. By doing this, the power unit and the vehicle body are elastically coupled by the engine mount 150. In the vehicle mounted state, a shared load of the power unit weight is applied to the engine mount 150, and the main rubber elastic body 160 is elastically deformed. By doing this, the first mounting member 156 and the second mounting member 158 are displaced in the direction relatively approaching in the mount center axial direction, and are positioned in opposition to each other with a designated separation distance. Also, for example, the engine mount 150 is mounted on the vehicle so as to have the vertical direction in FIG. 23 be the vehicle vertical direction, and the lateral direction in FIG. 23 be the front-back or lateral direction of the vehicle.

When vibration such as engine shake or the like is input via the inner bracket 170 to the engine mount 150, a vibration damping effect is exhibited on the input vibration by the resonance action or the like by non-compressible fluid flowing through the orifice passage 208.

Here, when excessive vibration is input to beneath the engine mount 150, the inner bracket 170 abuts the top end surface of the mounting part 244 of the sealing coupling member 154 via the bottom part buffer rubber layer 190. By doing this, the displacement amount in the relative approaching direction in the mount center axial direction of the first mounting member 156 and the second mounting member 158 is limited by buffering, and a bound stopper function can be exhibited.

Meanwhile, when excessive vibration is input above the engine mount 150, the first mounting member 156 abuts the upper surface of the gate-shaped part 232 at the sealing coupling member 154 via the top part buffer rubber layer 168. By doing this, the displacement volume in the relative separating direction in the mount center axial direction of the first mounting member 156 and the second mounting member 158 is limited by buffering, and a rebound stopper function can be exhibited.

Furthermore, when excessive vibration is input in the vehicle front-back or lateral direction in relation to the engine mount 150, the first mounting member 156 abuts the circumferential wall inner surface 246 on the sealing coupling member 154 via both side buffer rubber layers 198, 198. By doing this, the relative displacement volume in the vehicle front-back or lateral direction of the first mounting member 156 and the second mounting member 158 is limited by buffering, and it is possible to exhibit an axis-perpendicular direction stopper function.

With the engine mount 150 of the shape described above, the fixing parts 182, 182 of the mount body 152 is inserted in the clasping grooves 254, 254, and by the crushing and caulking process being implemented on both leg parts 250, 250 of the gate-shaped part 232, caulking engaging parts 260, 260 that cover the back end surface of the fixing parts 182, 182 are formed. By doing this, the mount body 152 is attached inside the mount holder part 248 with a simple structure having stable fall out resistance force. Also, in this way, since it is possible to perform the caulking process at the end of the manufacturing process, it is possible to simplify the engine mount 150 manufacturing process, and to increase manufacturing efficiency.

In particular, this crushing and caulking process is implemented locally on the sealing coupling member 154, so having large changes in the shape, strength or the like of the sealing coupling member is avoided, and it is possible to ensure a high degree of freedom of design for the sealing coupling member 154.

Also, with this embodiment, the distance between facing surfaces of the groove bottom surfaces 258, 258 with the pair of clasping grooves 254, 254 have a tilt so as to gradually expand and open facing the insertion port of the clasping groove 254, so it is easy to insert the mount body 152 inside the mount holder part 248.

Above, we gave a detailed description of embodiments of the present invention, but the present invention is not limited to those specific descriptions. For example, with the first to third embodiments, a structure is shown by example for which the mount body 12 (102, 132) and the sealing coupling member 14 (104, 134) sandwich the center axis of the mount body 12 (102, 132) and are fixed at both sides, but this is not necessarily limited to this structure, and it is also possible to have it fixed by one side that sandwiches the center axis. Also, the structure for fixing the mount body 12 (102, 132) and the sealing coupling member 14 (104, 134) is not necessarily limited to the structure of fitting the fitting convex part 30 (122, 138) and the fitting hole 96 (112, 148).

Also, with the first to third embodiments, the full seal was achieved between the second mounting member 18 (108, 135) and the temporary joint member 40 in a state with the sealing coupling member 14 (104, 134) mounted, and there is also a full seal between the second mounting member 18 (108, 135) and the partition member 60, and between the flexible film 36 and the partition member 60. However, for example, with the mount body 12 (102, 132) alone before the sealing coupling member 14 (104, 134) is mounted, it is also possible to have a temporary seal between the second mounting member 18 (108, 135) and the temporary joint member 40, to have a full seal between the second mounting member 18 (108, 135) and the partition member 60 and between the flexible film 36 and the partition member 60, and to have a full seal only between the second mounting member 18 (108, 135) and the temporary joint member 40 by mounting of the sealing coupling member 14 (104, 134).

Also, with the first to third embodiments, by having the second mounting member 18 (108, 135) inserted in the axial direction in relation to the temporary joint member 40, the temporary joint hook 48 is locked in the axial direction on the engaging projection 26 so as to be temporarily coupled, but for example it is also possible to have temporary coupling using a so-called twist lock structure by which locking is done in the axial direction by doing relative rotation in the circumference direction after inserting the second mounting member 18 (108, 135) and the temporary joint member 40 in the axial direction. In this case, by having a projection provided on one of the second mounting member 18 (108, 135) and the temporary joint member 40 be inserted in the groove provided on the other to have locking in the axial direction, the second mounting member 18 (108, 135) and the temporary joint member 40 are temporarily coupled in the axial direction, but by the dimensions of the groove in the axial direction being greater than the dimension of the projection, a full seal is realized by mounting of the sealing coupling member 14 (104, 134).

Meanwhile, with the fourth embodiment, it is also possible to implement the full seal of the fluid chamber 226 in a state with the mount body 152 alone.

Also, with the fourth embodiment, for example it is also possible to use an mode for which the full seal of the annular seal part 210 is done in advance, and in this case, it is possible to have only the sealing structure between the second mounting member 158 and the temporary joint member 214 undergo the full seal via the step of the temporary seal as with the fourth embodiment. Alternatively, it is also possible to use a mode with which the full seal of the sealing rubber 196 is done in advance, and in this case, it is possible to have the full seal done via the temporary sealing step only on the sealing structure between the partition member 200 and the temporary joint member 214.

Furthermore, there is no restriction on the specific structure of the inner bracket 170 and the sealing coupling member 154. For example, with the sealing coupling member 154, it is also possible to use a structure that does not have a peak part of the gate-shaped part 232. In the case using the sealing coupling member of this structure, when a rebound stopper function is necessary, it is also possible to use a separate rebound stopper of a separate structure or the like.

Yet further, the first mounting member 156 is not limited to the tube shape as described in the embodiment, and it is possible to use another suitable structure such as a block shape or the like.

Figure 37:
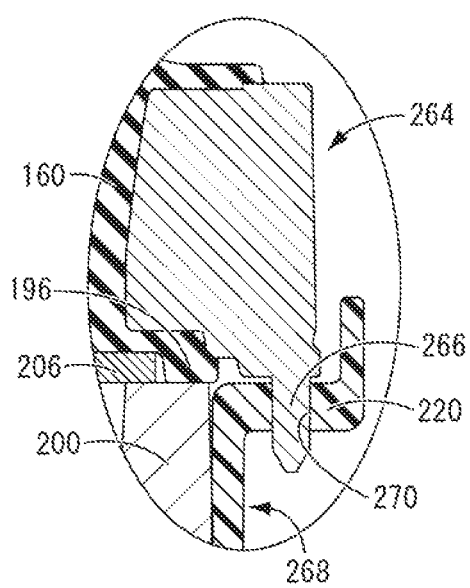
FIG. 37 is an enlarged cross section view of a principal part, suitable for explaining another mode of the temporary seal structure of the engine mount of this embodiment.

In addition, with the fourth embodiment, using the locking means by which the locking projection 222 of the locking part 224 of the temporary joint member 214 is locked on the locking part 180 of the second mounting member 158, the fluid chamber 226 underwent a fluid tight temporary seal, but the locking means is of course not limited to this. For example, as shown in FIG. 37, it is also possible to have this such that while a locking part 266 extending out in a rod shape facing downward from the bottom surface of the outer circumference side of a second mounting member 264 is formed on the second mounting member 264, a round cross section shaped press-fit hole 270 of a slightly smaller diameter than the locking part 266 is pierced into the sealing part 220 of a temporary joint member 268. By doing this, the locking part 266 of the second mounting member 264 is press fit into the press-fit hole 270 of the temporary joint member 268, and it is possible to do a temporary seal that is fluid tight for the fluid chamber 226.

Figure 38:
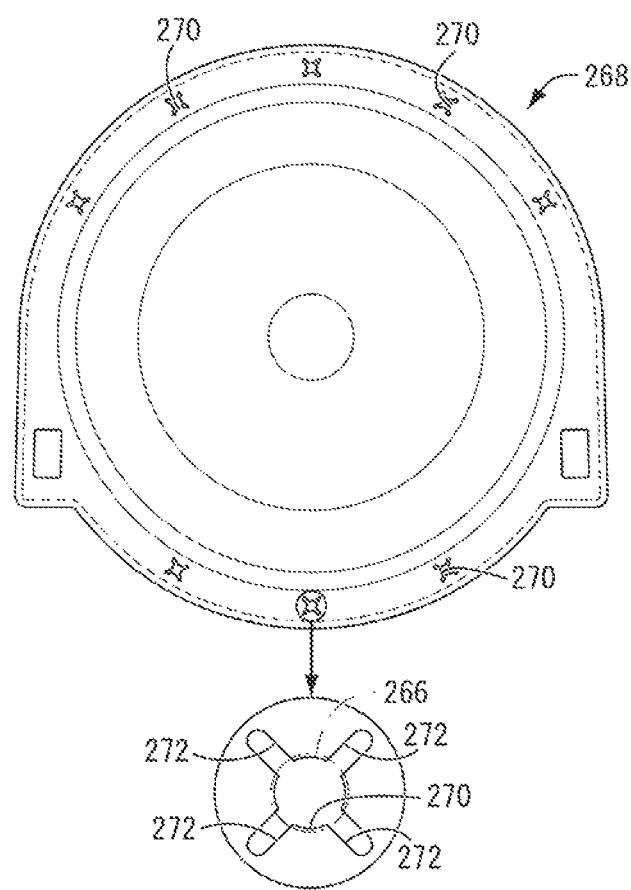
FIG. 38 is a bottom view of the mount body shown in FIG. 37.
Figure 39:
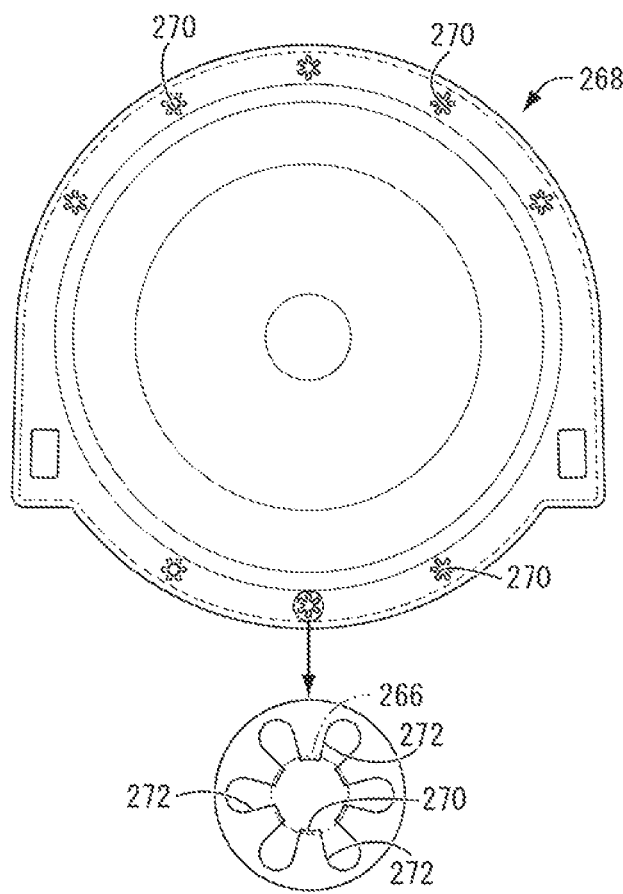
FIG. 39 is a bottom view showing a different shape of press-fit holes of a temporary joint member shown in FIG. 38.

Here, as shown in FIG. 38, a plurality (8 with this embodiment) of the press-fit holes 270 are provided separated by a distance on the circumference edge part of the temporary joint member 268. The press-fit holes 270 have four notch parts 272 that open on the inner wall of the press-fit hole 270 and the vertical direction of the sealing part 220, and that are formed separated by equal intervals in the circumference direction of the press-fit hole 270, exhibiting a cross shape overall with the bottom surface view. Using these notch parts 272, it is possible to have the inner wall of the press-fit hole 270 easily perform bending deformation in the vertical direction of the sealing part 220, so it is possible to reduce the insertion force when doing press fitting of the locking part 266 of the second mounting member 264 in the press-fit hole 270 of the temporary joint member 268. The shape of the press-fit hole 270 is not limited to this kind of cross shape, and it is also possible to any shape such as the flower petal shape shown in FIG. 39 (there are six notch parts 272), a star shaped item or the like.

Figure 40:
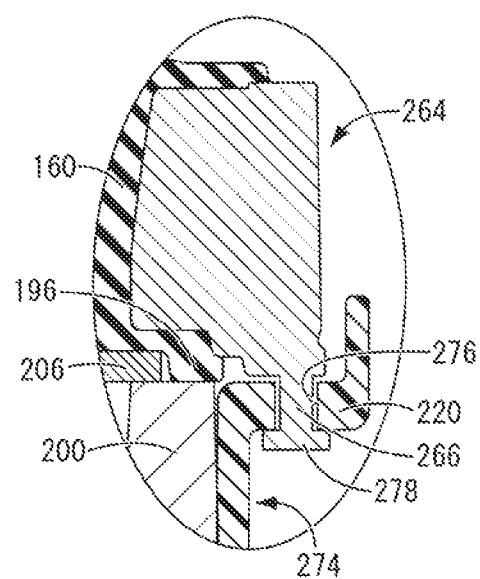
FIG. 40 is an enlarged cross section view of a principal part, suitable for explaining another mode of the temporary seal structure of the engine mount of this embodiment.

Also, as shown in FIG. 40, an insertion hole 276 with a round cross section shape and which has a larger diameter than the locking part 266 is pierced into the sealing part 220 of a temporary joint member 274, and after the locking part 266 of the second mounting member 264 is inserted in the insertion hole 276 of the second mounting member 264, it is possible to do crushing processing of the tip of the locking part 266. By doing this, a flange shaped crushed part 278 is formed, and by the crushed part 278 being engaged in the circumference edge part of the insertion hole 276, it is possible to do a fluid tight temporary seal of the fluid chamber 226.

Figure 41:
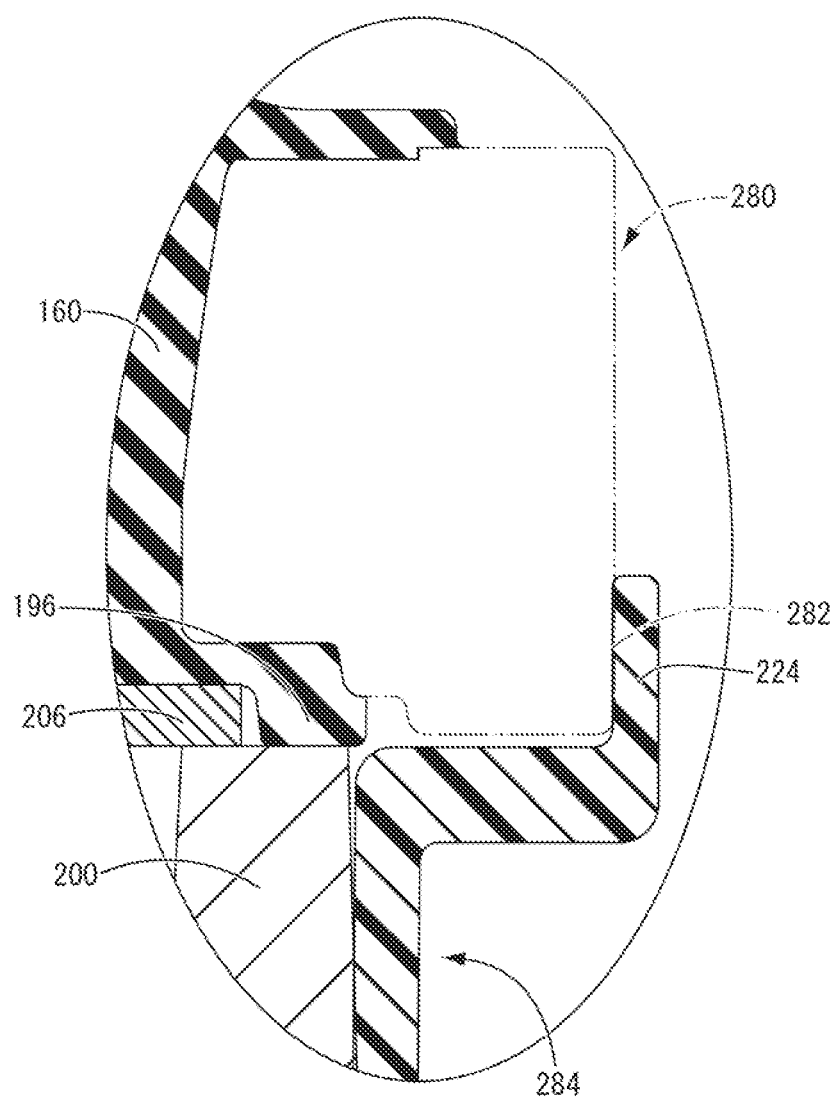
FIG. 41 is an enlarged cross section view of a principal part, suitable for explaining yet another mode of the temporary seal structure of the engine mount of this embodiment.

Furthermore, as shown in FIG. 41, it is also possible to have this so that by the inner circumference surface of the locking part 224 of a temporary joint member 284 being press fit on an outer circumference surface 282 of a second mounting member 280, the temporary joint member 284 is engaged with the second mounting member 280, and a fluid tight temporary seal is done for the fluid chamber 226. In this case, the diameter dimension of the outer circumference surface 282 of the second mounting member 280 is made larger than the diameter dimension of the inner circumference surface of the locking part 224 of the temporary joint member 284. With FIG. 41, to make it easier to understand, two dotted lines which are virtual lines indicate the second mounting member 280 to which the temporary joint member 284 is attached. The inner circumference surface of the temporary joint member 284 is fixed in a press fitting state to the outer circumference surface of the second mounting member 280 shown by the virtual lines in a diameter dimension relationship set for both items. The shape of the outer circumference surface 282 of the second mounting member 280 and the inner circumference surface of the locking part 224 of the temporary joint member 284 is not limited to a straight shape, and for the outer circumference surface 282 of the second mounting member 280, it is possible to have a tilted surface with a tapered shape of a taper degree that allows removing of the outer circumference surface 282, and at that time, with the shape of the inner circumference surface of the locking part 224 of the temporary joint member 284 also having a tilted surface of a tapered shape following that, it is possible to engage by having the temporary joint member 284 press fit to the second mounting member 280. Of course this is not limited to the example shown, and it is also possible to provide a projection on the outer circumference surface of the second mounting member 280 or the inner circumference surface of the locking part 224 of the temporary joint member 284 for press fitting the temporary joint member 284 on the second mounting member 280.

Also, the specific structures of the vibration damping device main unit shown in the first through fourth embodiments are nothing more than examples, and the structure of the partition member and the like are not particularly limited, and it is also possible to use an active type vibration damping device main unit that applies active oscillation force using an actuator to offset the input vibration, or a switching type vibration damping device main unit that can switch the vibration damping characteristics using the actuator according to the input vibration.

The applicable scope of the present invention is not limited to an engine mount, and can also be used for a suspension member mount, a body mount, a differential mount or the like, for example. Also, the present invention is not applied only to fluid-filled vibration damping device used for automobiles, but can also be applied to fluid-filled vibration damping devices used for motorcycles, railway vehicles, industrial vehicles and the like.

What is claimed is:

1. A fluid-filled vibration damping device comprising
a vibration damping device main unit which includes a first mounting member, an annular second mounting member, a main rubber elastic body elastically connecting the first and second mounting members, and a fluid chamber whose wall is partially constituted by the main rubber elastic body and which is filled with a non-compressible fluid, wherein
the vibration damping device main unit further includes a joint member locked on the second mounting member and temporarily coupled thereto in an axial direction, and an annular sealing part provided to the joint member and overlapped on the second mounting member in the axial direction with a sealing rubber sandwiched therebetween so as to achieve a temporary seal,
a sealing coupling member is mounted on the second mounting member of the vibration damping device main unit, and the sealing coupling member exerts a pressing force in a direction of overlapping on the second mounting member and the joint member so as to increase a compression ratio of the sealing rubber and achieve a full seal,
the main rubber elastic body is disposed on a first axial side of the second mounting member while a flexible film is disposed on a second axial side of the second mounting member so as to provide the fluid chamber between the main rubber elastic body and the flexible film,
a partition member is arranged between the second mounting member and the flexible film so as to partition the fluid chamber into a pressure receiving chamber and an equilibrium chamber, and an orifice passage is provided that places the pressure receiving chamber and the equilibrium chamber in communication with each other, and
a pressing force by the joint member is exerted on an outer circumference edge of the flexible film overlapped on an outside of the partition member in addition to a sealing member arranged between the second mounting member and the partition member so that both the sealing member and the outer circumference edge of the flexible film achieve the temporary seal while achieving the full seal provided by the sealing coupling member.

2. The fluid-filled vibration damping device according to claim 1, further comprising at least one set of a fitting convex part and a fitting hole, the fitting convex part being provided to one of the second mounting member and the sealing coupling member while the fitting hole being provided to another of the second mounting member and the sealing coupling member, wherein
the fitting convex part is fit and fixed into the fitting hole.

3. The fluid-filled vibration damping device according to claim 2, wherein the at least one set of the fitting convex part and the fitting hole comprises a plurality of sets of the fitting convex part and the fitting hole, and the plurality of the sets of the fitting convex part and the fitting hole are arranged at both sides sandwiching a center axis of the vibration damping device main unit.

4. The fluid-filled vibration damping device according to claim 1, wherein
the sealing coupling member includes a mounting part that partially covers an outer circumference of the second mounting member,
the mounting part of the sealing coupling member has at least one clasping groove extending in a circumferential direction, and
the second mounting member and the joint member are in the clasping groove so as to achieve the full seal between the second mounting member and the temporary joint member by the sealing rubber.

5. The fluid-filled vibration damping device according to claim 4, wherein
a pair of fixing parts are provided to the outer circumference of the second mounting member of the vibration damping device main unit at sites opposite to each other in an axis-perpendicular direction,
the at least one clasping groove comprises a pair of the clasping grooves for fitting to the fixing parts of the vibration damping device main unit which are formed on an inner surface of an installation space for the vibration damping device main unit in the sealing coupling member at sites opposite to each other while having insertion ports opening in a direction of insertion of the respective fixing parts,
an outer circumference surface of each fixing part is abutted against a groove bottom surface of the corresponding clasping groove so that each fixing part is fit into the corresponding clasping groove, and
on an opening end surface of each insertion port of the sealing coupling member, a circumference edge part on a groove bottom surface side of the clasping groove undergoes plastic deformation in a groove inward direction by a crushing and caulking process and is engaged with a back part of the fixing part in the direction of insertion into the clasping groove so as to provide a caulking engaging part that prevents falling out of the fixing part from the clasping groove in a backward direction of insertion.

6. The fluid-filled vibration damping device according to claim 5, wherein on each groove bottom surface of the clasping grooves, a tilt is present such that a separation distance in a direction of opposition of the clasping grooves gradually becomes larger toward the insertion ports, while on each outer circumference surface of the fixing parts, the tilt corresponding to that of the groove bottom surface of the clasping groove.

7. The fluid-filled vibration damping device according to claim 6, wherein each outer circumference surface of the fixing parts is constituted by a plurality of abutting projections divided via recesses in the direction of insertion into the corresponding clasping groove, and each of the abutting projections is abutted against the groove bottom surface of the clasping groove.

8. The fluid-filled vibration damping device according to claim 5, wherein a concave crushed part on the opening end surface of each insertion port of the sealing coupling member has an asymmetrical inner surface shape such that a deepest position thereof is biased to the groove bottom surface side of the clasping groove.

9. The fluid-filled vibration damping device according to claim 1, further comprising a guide member for relatively aligning and guiding the second mounting member and the sealing coupling member during mounting of the vibration damping device main unit to the sealing coupling member.

10. The fluid-filled vibration damping device according to claim 1, wherein the joint member includes a locking part projecting from the sealing part in one axial direction so as to be locked to the second mounting member and a pressed part projecting from the sealing part in another axial direction so as to be pushed by the sealing coupling member in a direction of approach to the second mounting member, and the locking part and the pressed part are alternately provided on a circumference of the joint member.

11. The fluid-filled vibration damping device according to claim 1, wherein
the sealing coupling member includes a tube-shaped mounting part, and an attachment part is formed that extends to an outer circumferential side from the mounting part while a pressing part is formed that extends to an inner circumferential side from the mounting part, and
the second mounting member of the vibration damping device main unit is fixed to the attachment part while the joint member is pressed by abutting on the pressing part and displaced to relatively get closer to the second mounting member so as to achieve the full seal between the second mounting member and the joint member by the sealing rubber.

12. The fluid-filled vibration damping device according to claim 1, wherein the sealing coupling member is a die cast molded component made of aluminum alloy.

13. The fluid-filled vibration damping device according to claim 1, wherein a pressing section of the sealing coupling member against the second mounting member is partially provided on a circumference of the second mounting member, while a pressing section of the sealing coupling member against the joint member is provided along an entire circumference of the joint member.

* * * * *